US012075534B2

(12) United States Patent
Wang et al.

(10) Patent No.: US 12,075,534 B2
(45) Date of Patent: Aug. 27, 2024

(54) HYBRID DIMMING CONTROL DEVICE AND HYBRID DIMMING CONTROL METHOD

(71) Applicant: LX SEMICON CO., LTD., Daejeon (KR)

(72) Inventors: Yun Sung Wang, Daejeon (KR); Sang Suk Kim, Daejeon (KR); Jang Su Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/083,125

(22) Filed: Dec. 16, 2022

(65) Prior Publication Data

US 2023/0199927 A1 Jun. 22, 2023

(30) Foreign Application Priority Data

Dec. 20, 2021 (KR) ........................ 10-2021-0182515

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
CPC ........ H05B 45/325; H05B 45/10; G09G 5/10; G09G 2320/0233; G09G 2320/0271; G09G 2340/0435
See application file for complete search history.

(56) References Cited

U.S. PATENT DOCUMENTS 11,056,037 B1 * 7/2021 Buckley .................. G06F 1/163
2007/0205969 A1 * 9/2007 Hagood ................. G02B 26/02 345/84
2008/0266236 A1 * 10/2008 Shen .................... G09G 3/3406 345/102
2019/0347981 A1 * 11/2019 Horowitz ............ H04N 9/3135

* cited by examiner

*Primary Examiner* — Minh D A
(74) *Attorney, Agent, or Firm* — Greenberg Traurig, LLP

(57) ABSTRACT

A hybrid dimming control device, which prevents image quality degradation during local dimming of a backlight unit, includes an analysis circuit configured to determine a type of dimming data for controlling the local dimming of a light source included in a backlight unit by analyzing the dimming data, a pulse width modulation (PWM) dimming control circuit configured to control the local dimming of the light source by a PWM method when the type of the dimming data is a first type, and an active dimming control circuit configured to convert some bits of the dimming data into an analog signal and control the local dimming of the light source using the analog signal when the type of the dimming data is a second type.

17 Claims, 12 Drawing Sheets

HYBRID DIMMING CONTROL DEVICE AND HYBRID DIMMING CONTROL METHOD

CROSS-REFERENCE TO RELATED APPLICATIONS

This application claims the benefit of the Korean Patent Application No. 10-2021-0182515 filed on Dec. 20, 2021, which is hereby incorporated by reference as if fully set forth herein.

FIELD

The present disclosure relates to a display device, and more particularly, to a dimming control of a display device.

BACKGROUND

Liquid crystal display (LCD) devices display an image by adjusting a light transmittance of a liquid crystal. To this end, the LCD devices include an LCD panel in which liquid crystal cells are arranged in a matrix form, a driving circuit for driving the LCD panel, and a backlight unit for irradiating light to the LCD panel.

Recently, a light-emitting diode (LED) backlight unit using an LED, which has advantages of higher brightness and lower power consumption than a conventional lamp, as a light source is getting the spotlight.

A general LED backlight unit implements local dimming by controlling a light amount of LEDs using a pulse width modulation (PWM) signal determined according to the brightness of an image displayed on an LCD panel.

However, when the light amount of the LEDs is adjusted using the PWM signal, there is a problem that a flicker phenomenon in which the LED flickers may occur due to a change in duty of the PWM signal, which may cause image quality degradation.

Meanwhile, in the case of a high-resolution display device such as a 4K resolution display device or an 8K resolution display device, a plurality of pins (or channels) may be included to implement local dimming in detail, and thus, the plurality of channels must be controlled at once, so that dimming data for controlling each channel is inevitably increased. Accordingly, since the high-resolution display device operates in such a manner that local dimming data is transmitted during one frame and local dimming of a previous frame is implemented in a next frame, there is a problem that a response time is longer than one frame period.

SUMMARY

The present disclosure is directed to providing a hybrid dimming control device and method capable of preventing image quality degradation during local dimming of a backlight unit.

The present disclosure is also directed to providing a hybrid dimming control device and method capable of reducing a time difference between an image displayed on a display panel and local dimming of a backlight unit.

The present disclosure is also directed to providing a hybrid dimming control device and method capable of reducing the number of channels between a micro controller unit and a dimming control device.

The present disclosure is also directed to providing a hybrid dimming control device and method capable of increasing the number of dimming control devices connectable to one micro controller unit.

The present disclosure is also directed to providing a hybrid dimming control device capable of determining by itself whether it is dimming data to be processed by itself, and a method thereof.

According to an aspect of the present disclosure, there is provided a hybrid dimming control device including an analysis circuit configured to determine a type of dimming data for controlling the local dimming of a light source included in a backlight unit by analyzing the dimming data, a pulse width modulation (PWM) dimming control circuit configured to control the local dimming of the light source using a first bit group including a most significant bit (MSB) of the dimming data when the type of the dimming data is a first type, and an active dimming control circuit configured to control the local dimming of the light source using a second bit group including a least significant bit (LSB) of the dimming data and a third bit group composed of bits excluding the first and second bit groups from the dimming data when the type of the dimming data is a second type.

According to another aspect of the present disclosure, there is provided a hybrid dimming control method including determining a type of dimming data by analyzing the dimming data, controlling local dimming of a light source of a backlight unit using a pulse width modulation (PWM) signal generated using a first bit group including a most significant bit (MSB) of the dimming data when the type of the dimming data is a first type in which a grayscale value corresponding to the dimming data is equal to or less than a predetermined reference grayscale value, and controlling the local dimming of the light source using an analog signal generated using a second bit group including a least significant bit (LSB) of the dimming data and a third bit group composed of bits excluding the first and second bit groups from the dimming data when the type of the dimming data is a second type in which the grayscale value corresponding to the dimming data is greater than the reference grayscale value.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
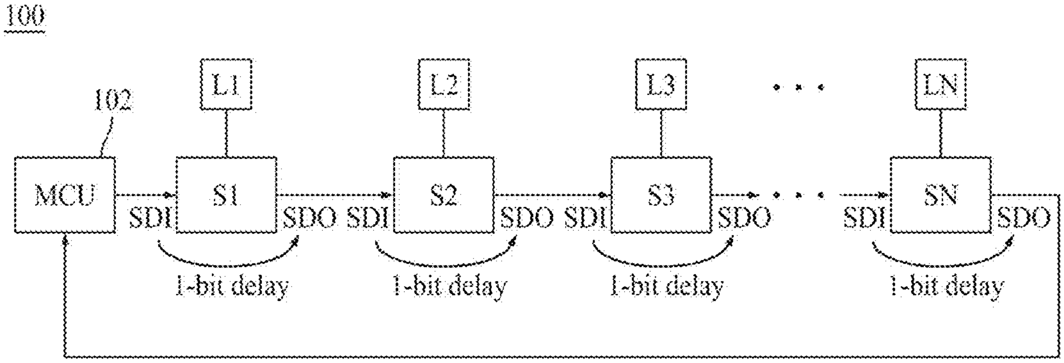
FIG. 1 is a block diagram schematically illustrating a configuration of a backlight unit control system to which a hybrid dimming control device according to one embodiment of the present disclosure is applied.

Throughout the specification, like reference numerals refer to substantially like components. In the following description, detailed descriptions of configurations and functions not related to a core configuration of the present disclosure and known in the art may be omitted. The terms used in this specification should be understood as follows.

Advantages and features of the present disclosure and implementation methods thereof will be clarified through the following embodiments described with reference to the accompanying drawings. However, the present disclosure is not limited to the embodiments described below and may be implemented with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and are not limited to details shown in the present disclosure. Throughout the specification, like reference numerals refer to like components. Further, in describing the present disclosure, detailed descriptions of well-known technologies will be omitted when it is determined that they may unnecessarily obscure the gist of the present disclosure.

Terms such as "including," "having," and "composed of" used herein are intended to allow other elements to be added unless the terms are used with the term "only." Any references to the singular may include the plural unless expressly stated otherwise.

Components are interpreted as including an ordinary error range even if not expressly stated.

For the description of a temporal relationship, for example, when a temporal relationship is described as "after," "subsequently to," "next," "before," and the like, a non-consecutive case may be included unless the term "immediately" or "directly" is used in the expression.

Although the terms "first," "second," and the like may be used herein to describe various components, the components are not limited by the terms. These terms are used only to distinguish one component from another component. Therefore, a first component described below may be a second component within the technical spirit of the present disclosure.

When the term "at least one" is used, it should be understood to include all possible combinations of one or more of the associated listed items. For example, the meaning of "at least one of a first item, a second item, and a third item" may mean a combination of all items that can be presented from two or more of the first item, the second item and the third item as well as each of the first item, the second item or the third item.

The features of various embodiments of the present disclosure can be partially or entirely bonded to or combined with each other and can be interlocked and operated in technically various ways, and the embodiments can be carried out independently of or in association with each other.

Hereinafter, embodiments of the present specification will be described in detail with reference to the accompanying drawings.

FIG. 1 is a block diagram schematically illustrating a configuration of a backlight unit control system to which a hybrid dimming control device according to one embodiment of the present disclosure is applied.

As shown in FIG. 1, a backlight unit control system 100 according to one embodiment of the present disclosure includes a micro controller unit (MCU) 102 and a plurality of hybrid dimming control devices S1 to SN (hereinafter, referred to as "dimming control devices") connected in a daisy-chain manner to the micro controller unit 102.

The micro controller unit 102 generates an input data packet SDI including dimming data for controlling dimming of light sources L1 to LN and transmits the input data packet SDI to the plurality of dimming control devices S1 to SN.

In one embodiment, one micro controller unit 102 may be connected in a daisy-chain manner to the plurality of dimming control devices S1 to SN. Accordingly, the number of channels for connecting between the micro controller unit 102 and the dimming control devices S1 to SN is reduced, and a time for transmitting the input data packet SDI is reduced, so that a data processing speed is increased. In addition, the time for transmitting the input data packet SDI is reduced, and a timing margin is enhanced, so that a large number of dimming control devices S1 to SN may be connected in a daisy-chain manner to one micro controller unit 102.

The plurality of dimming control devices S1 to SN control local dimming of the light sources L1 to LN respectively connected to the dimming control devices S1 to SN using the dimming data included in the input data packet SDI. In one embodiment, the light sources L1 to LN connected to the respective dimming control devices S1 to SN may be a light-emitting diode (LED) group composed of at least one LED.

Specifically, a first dimming control device S1 is connected to the micro controller unit 102 and receives the input data packet SDI from the micro controller unit 102. The first dimming control device S1 generates an output data packet SDO delayed by one bit from the received input data packet SDI and outputs the output data packet SDO to a second dimming control device S2. The second dimming control device S2 uses the output data packet SDO output from the first dimming control device S1 as the input data packet SDI and delays the input data packet SDI again by one bit to generate the output data packet SDO, and outputs the output data packet SDO to a third dimming control device S3.

As described above, according to the present disclosure, since the dimming control devices S1 to SN output the input data packet SDI by delaying the input data packet SDI only by one bit, even when the backlight unit control system 100 includes N dimming control devices S1 to SN, a total delay occurs only by N*one bit and thus a dimming data transmission time is reduced, so that the number of the dimming control devices S1 to SN connectable to the micro controller unit 102 may be increased.

In the above-described embodiment, each of the micro controller unit 102 and the dimming control devices S1 to SN may be a semiconductor integrated circuit or a package in which a semiconductor integrated circuit is packaged.

Hereinafter, a configuration of the micro controller unit 102 and the dimming control devices S1 to SN according to the present disclosure will be described in more detail with additional reference to FIGS. 2 to 8.

Figure 2:
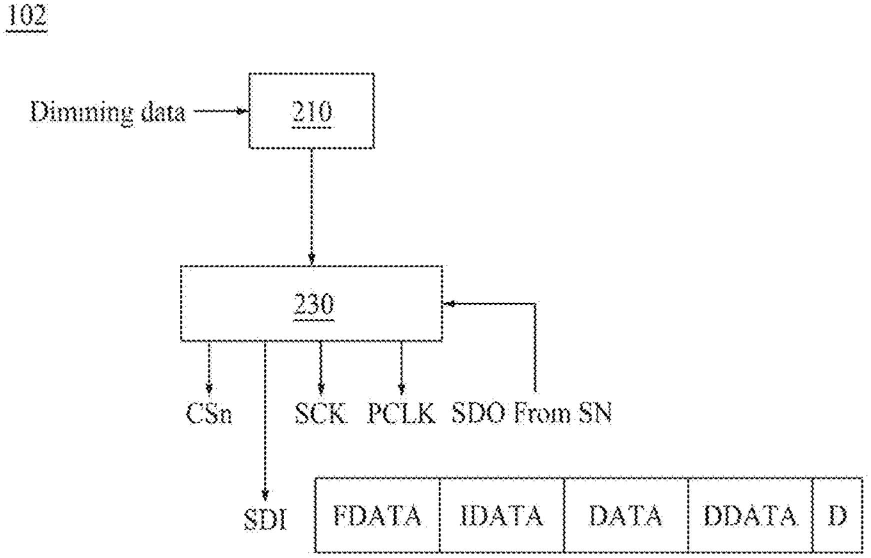
FIG. 2 is a block diagram schematically illustrating a configuration of a micro controller unit shown in FIG. 1.
Figure 3:
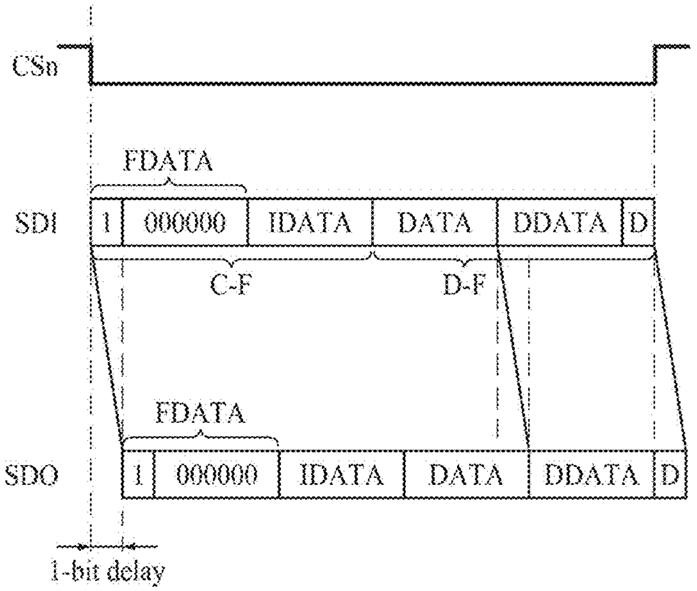
FIG. 3 is a diagram exemplarily illustrating a data format of each of an input data packet generated by the micro controller unit of FIG. 2 and an output data packet generated by delaying the input data packet by one bit.

FIG. 2 is a block diagram schematically illustrating a configuration of the micro controller unit according to one embodiment of the present disclosure, and FIG. 3 is a diagram exemplarily illustrating a data format of each of the input data packet generated by the micro controller unit of FIG. 2 and the output data packet generated by delaying the input data packet by one bit.

As shown in FIGS. 1 and 2, the micro controller unit 102 connected in a daisy-chain manner to the plurality of dimming control devices S1 to SN includes a controller 210 and a packet generator 230. In FIG. 2, for convenience of description, the micro controller unit 102 is illustrated as including one packet generator 230, but in another embodiment, the micro controller unit 102 may include a plurality of packet generators 230.

The controller 210 receives dimming data from an external source (not shown). The controller 210 determines bits to be included in the input data packet SDI based on the dimming data so that the packet generator 230 may generate the input data packet SDI.

Specifically, the controller 210 determines bits constituting first data FDATA, bits constituting second data IDATA, and bits constituting dimming data DATA, which are to be included in the input data packet SDI. The first data FDATA includes bits for enabling a specific dimming control device to determine by itself which dimming control device it is from among the plurality of dimming control devices S1 to SN. As described below, each of the dimming control devices S1 to SN may set identification information (ID) thereof (hereinafter, referred to as "first ID") using the bits included in the first data FDATA.

In one embodiment, a most significant bit among the bits included in the first data FDATA has a value of "1," and the first data FDATA may have a value of 80 (hex). Here, "hex" refers to hexadecimal.

The second data IDATA includes bits representing unique information (hereinafter referred to as "second ID") specifying the dimming control device, which needs to process the dimming data DATA, among the plurality of dimming control devices S1 to SN.

The dimming data DATA includes bits for controlling the local dimming of the light sources L1 to LN.

Meanwhile, the controller 210 may further determine bits to be included in first dummy data DDATA indicating the number of the plurality of dimming control devices S1 to SN. In one embodiment, the controller 210 may set all values of the bits to be included in the first dummy data DDATA to "0". The controller 210 further determines the bits of the first dummy data DDATA, which indicates the number of the plurality of dimming control devices S1 to SN, because although each of the N dimming control devices S1 to SN should receive all the dimming data DATA included in the input data packet SDI while a chip selection signal CSn is maintained at a low level, the chip selection signal CSn may transition to a high level in a state in which an N-th dimming control device SN does not receive all of the dimming data DADA since the input data packet SDI output from the micro controller unit 102 is delayed by one bit while passing through each of the N dimming control devices S1 to SN, and thus, the N-th dimming control device SN may not receive some of the dimming data DATA.

Further, the controller 210 may additionally determine a bit to be included in second dummy data D. The second dummy data D means one dummy bit that is set to safely receive the output data packet SDO before the chip selection signal CSn ends. In one embodiment, one bit of the second dummy data D may be set to "0."

The packet generator 230 generates the input data packet SDI by arranging the bits determined by the controller 210 according to a serial peripheral interface (SPI) communication protocol.

The packet generator 230 outputs the generated input data packet SDI to the first dimming control device S1 among the plurality of dimming control devices S1 to SN connected thereto in a daisy-chain manner. The packet generator 230 may output the input data packet SDI to the first dimming control device S1 together with the chip selection signal CSn, a serial clock signal SCK, and a pulse width modulation (PWM) clock signal PCLK for dimming control.

Here, the chip selection signal CSn refers to a signal for selecting the dimming control device to be operated among the plurality of dimming control devices S1 to SN, the serial clock signal SCK refers to a clock signal used by each of the dimming control devices S1 to SN to process the first ID, the second ID, and the dimming data, and the PWM clock signal PCLK refers to a clock signal used to generate a PWM signal for controlling dimming of the light sources L1 to LN.

FIG. 3 illustrates an example of the input data packet transmitted to the first dimming control device S1 by the packet generator 230. As shown in FIG. 3, the input data packet SDI, which is input to the first dimming control device S1, may include a command field C_F and a data field D_F. The command field C_F may include the first data FDATA and the second data IDATA, and the data field D_F may include the dimming data DATA. In FIG. 3, it is illustrated that one dimming data DATA is included in the data field D_F, but a plurality of pieces of dimming data DATA may be included in the data field D_F according to the number of LEDs controlled by each of the dimming control devices S1 to SN. For example, when each of the dimming control devices S1 to SN controls T LEDs, the data field D_F may include T pieces of dimming data DATA1 to DATAT. Depending on the embodiment, the data field D_F may further include the first dummy data DDATA and the second dummy data D.

Meanwhile, the packet generator 230 receives the output data packet SDO from the N-th dimming control device SN, which is the last dimming control device among the plurality of dimming control devices S1 to SN, and transmits the received output data packet SDO to the controller 210. The controller 210 may check whether the input data packet SDI is normally transmitted to the plurality of dimming control devices S1 to SN by calculating delayed bits of the received output data packet SDO.

Hereinafter, the dimming control device according to the present disclosure will be described in detail with reference to FIGS. 4 to 12.

Figure 4:
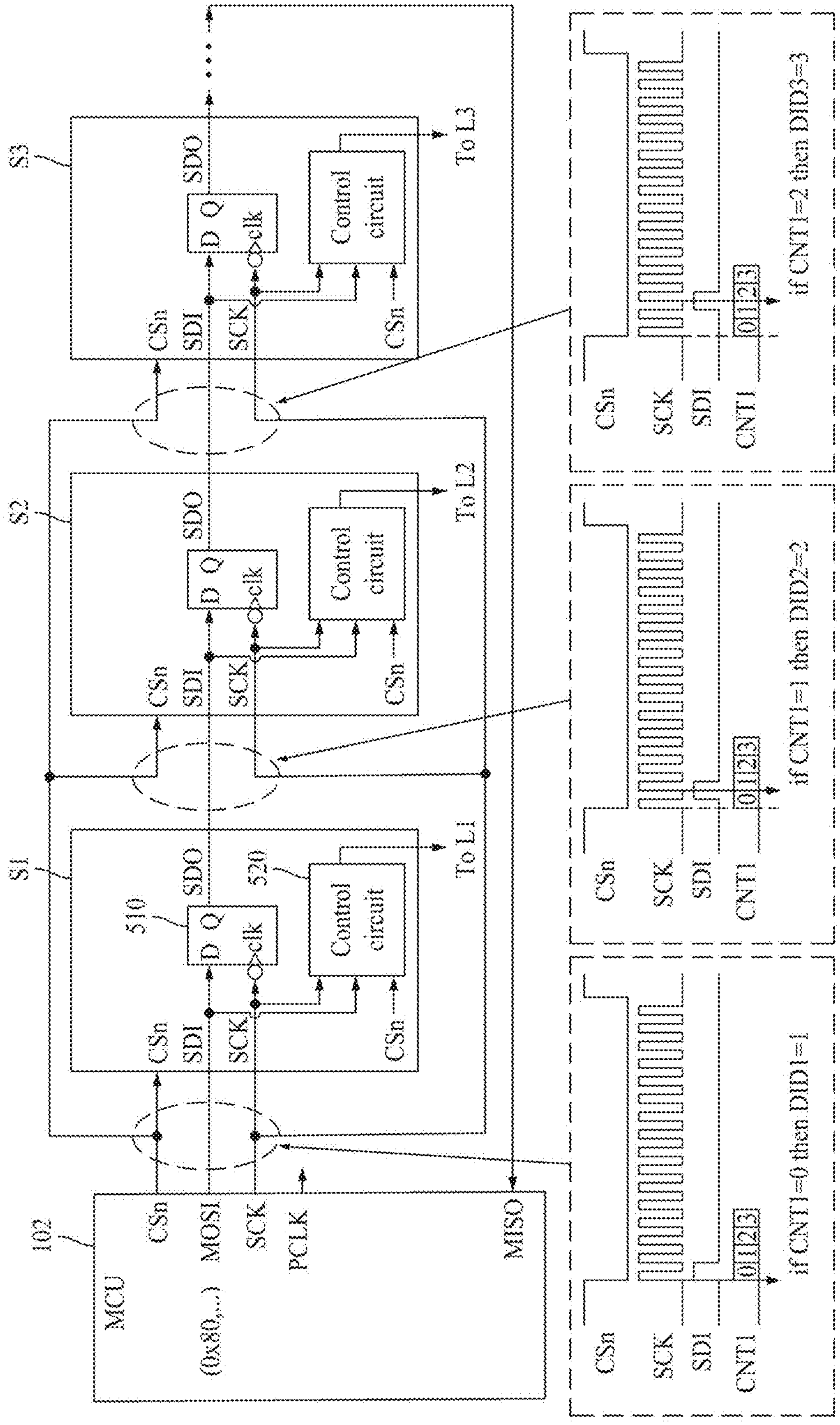
FIG. 4 is a timing diagram for describing the hybrid dimming control devices shown in FIG. 1 and an operation of each of the hybrid dimming control devices.

FIG. 4 is a timing diagram for describing the dimming control devices shown in FIG. 1 and an operation of each of the dimming control devices. It is assumed that the structure and operation method of each dimming control device are the same, and hereinafter, for convenience of description, descriptions are made based on operations of first to third dimming control devices S1 to S3.

The micro controller unit 102 transmits the chip selection signal CSn, the serial clock signal SCK, and the PWM clock signal PCLK to the first to third dimming control devices S1 to S3 connected in a daisy-chain manner to the packet generator 230. The micro controller unit 102 transmits a master output slave input MOSI to the first dimming control device S1 connected to the packet generator 230. The micro controller unit 102 receives a master input slave output MISO, which is output from the N-th dimming control device SN, through the packet generator 230.

The master output slave input MOSI refers to the input data packet SDI transmitted to the first dimming control device S1, and the master input slave output MISO refers to the output data packet SDO transmitted from the N-th dimming control device SN.

As shown in FIG. 4, the first dimming control device S1 includes a D-flip-flop circuit 510 and a control circuit 520.

The D-flip-flop circuit 510 captures the input data packet SDI at a second edge (e.g., a falling edge) of the serial clock signal SCK to output the output data packet SDO. A setup timing margin is improved as the D-flip-flop circuit 510 that responds to a falling edge is used.

The D-flip-flop circuit 510 outputs the output data packet SDO generated by delaying the input data packet SDI by one bit (also referred to as a one-bit time) to the second dimming control device S2.

The control circuit 520 performs a count operation in response to a first edge (e.g., a rising edge) of the serial dock signal SCK, and determines the first ID using a count value at the time at which a bit firstly having a value of “1” among the bits included in the first data FDATA is input. The control circuit 520 compares the determined first ID with the second ID included in the second data IDATA, and controls the light source L1 connected to the first dimming control device S1 using the dimming data DATA when the first ID and the second ID match and passes the dimming data DATA when the first ID and the second ID do not match.

For example, when a count value CNT1 at the time at which a bit firstly having a value of “1” among the bits (e.g., 10000000 (bin)) included in the first data FDATA of the input data packet SDI that is input to the first dimming control device S1 is input is 0 (dec) and an initial count value is 0 (dec), the first dimming control device S1 sets ID DID1 thereof to 1 (dec). Here, “bin” refers to binary, and “dec” refers to decimal.

The second dimming control device S2, which receives the output data packet SDO delayed by one bit by the D-flip-flop circuit 510 of the first dimming control device S1 as the input data packet SDI, sets ID DID2 thereof to 2 (dec) when the count value CNT1 at the time at which the bit firstly having a value of “1” among the bits included in the first data FDATA of the input data packet SDI is input, is 1 (dec) and the initial count value is 0 (dec).

The third dimming control device S3, which receives the output data packet SDO delayed by one bit by the D-flip-flop circuit of the second dimming control device S2 as the input data packet SDI, sets ID DID3 thereof to 3 (dec) when the count value CNT1 at the time at which the bit firstly having a value of “1” among the bits included in the first data FDATA of the input data packet SDI is input, is 2 (dec) and the initial count value is 0 (dec).

Each of the dimming control devices S1 to SN determines ID DIDi thereof using a timing when the count value CNT1 at the time at which the bit firstly having a value of “1” among the bits included in the first data FDATA of the input data packet SDI is input, is detected and the initial count value.

Since each of the dimming control devices S1 to SN captures the input data packet SDI at the second edge of the serial clock signal SCK to output the output data packet SDO, N bits delay is generated between the input data packet SDI of the first dimming control device S1 and the output data packet SDO of the N-th dimming control device SN.

Figure 5:
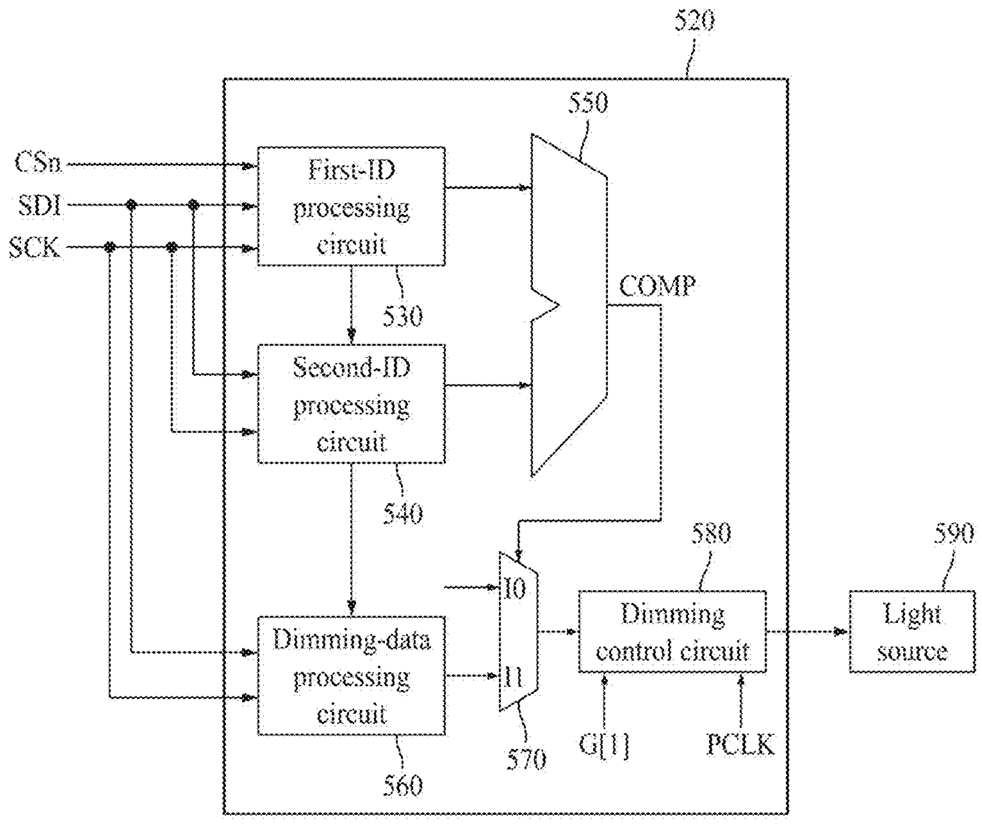
FIG. 5 is a block diagram specifically illustrating a configuration of a control circuit shown in FIG. 4.
Figure 6:
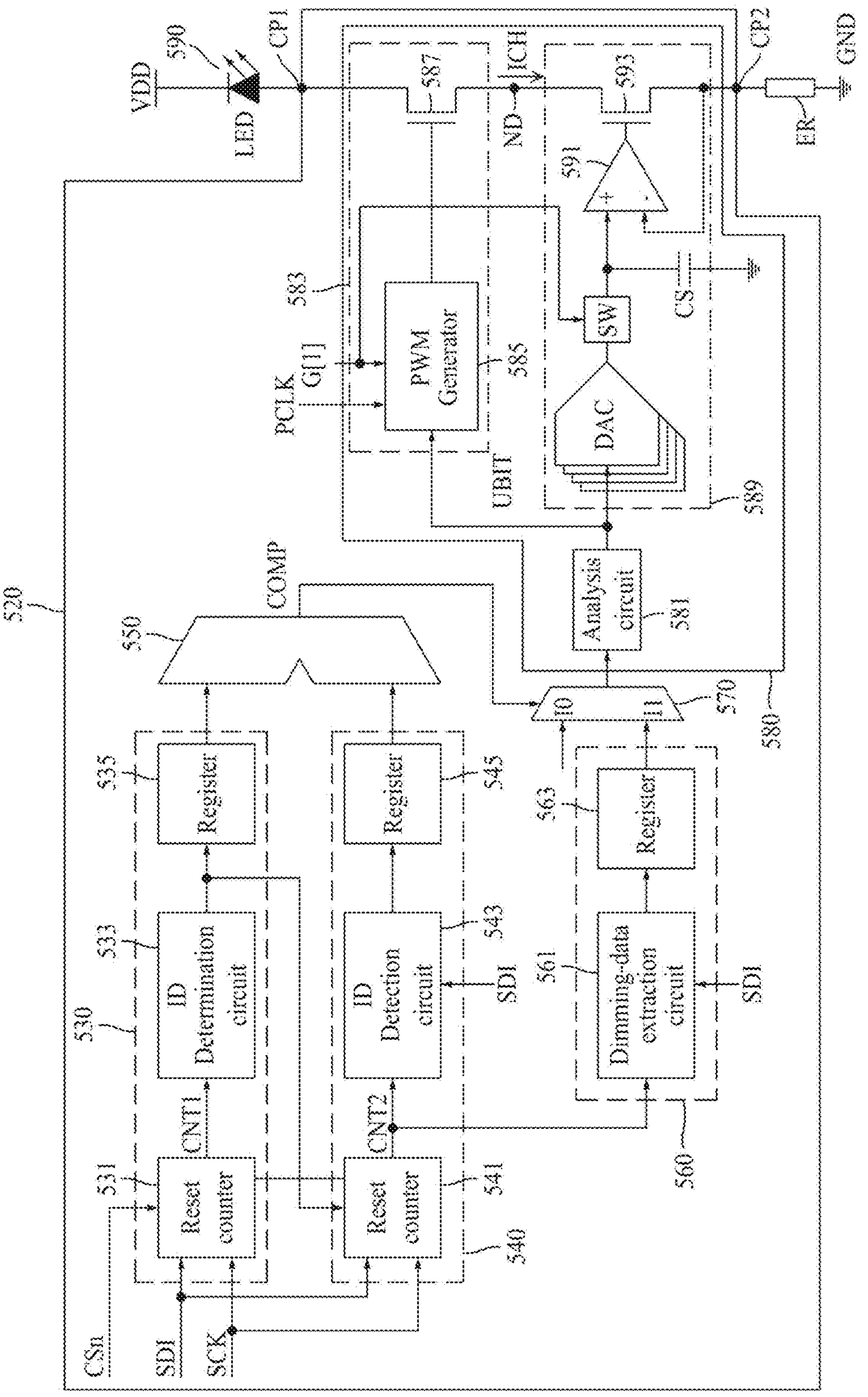
FIG. 6 is a diagram illustrating an implementation example of the control circuit shown in FIG. 5.
Figure 7:
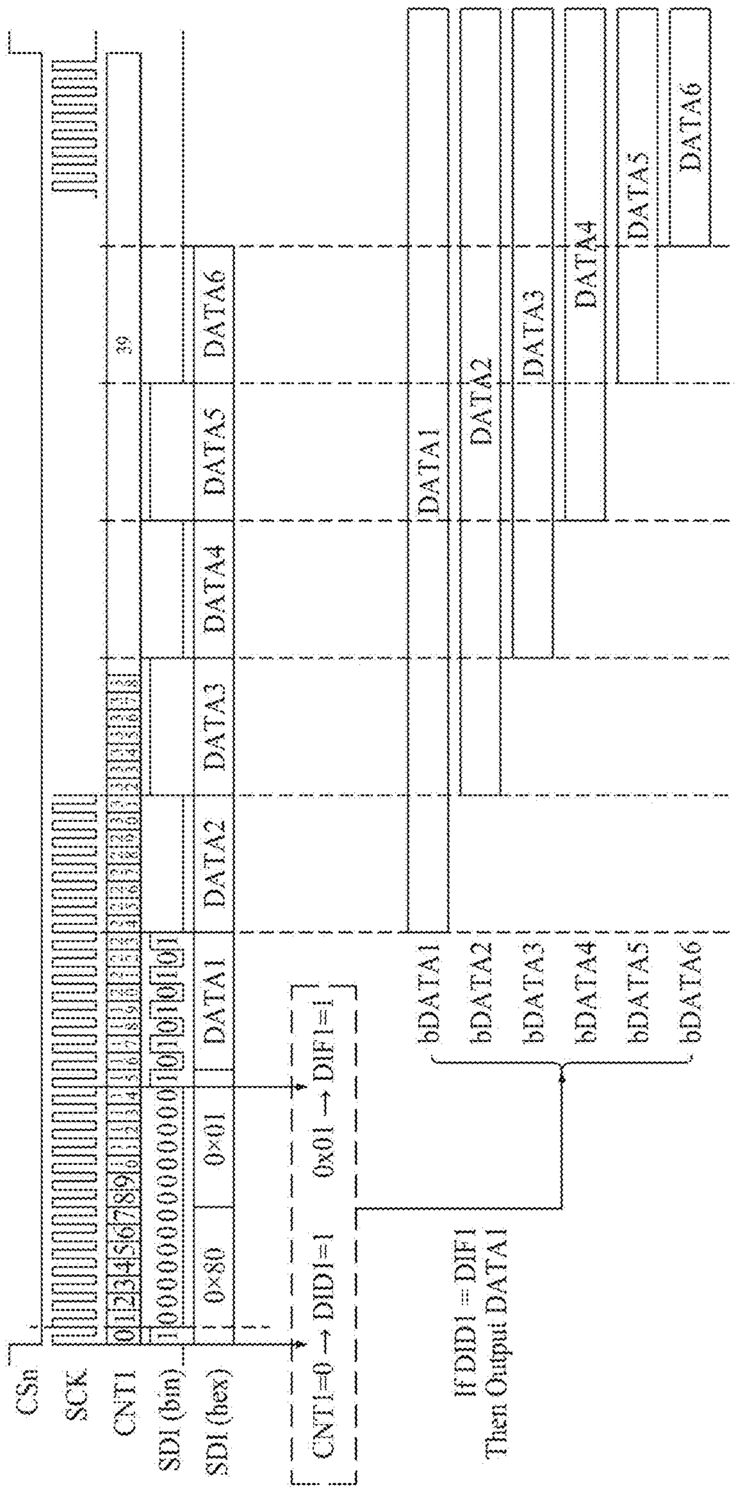
FIG. 7 is a timing diagram illustrating a data format of the input data packet generated by the micro controller unit shown in FIG. 2 and a detailed operation of the control circuit.

FIG. 5 is a block diagram of the control circuit shown in FIG. 4, FIG. 6 is a diagram illustrating an implementation example of the control circuit shown in FIG. 5, and FIG. 7 is a timing diagram illustrating a data format of the input data packet generated by the micro controller unit shown in FIG. 2 and a detailed operation of the control circuit.

Referring to FIGS. 1 to 6, the control circuit 520 includes a first-ID processing circuit 530, a second-ID processing circuit 540, a comparison circuit 550, a dimming-data processing circuit 560, a selection circuit 570, and a dimming control circuit 580.

The first-ID processing circuit 530 performs a first count operation in response to a first edge of the serial clock signal SCK. The first-ID processing circuit 530 outputs a count value at the time at which the bit firstly having a value of “1” among the bits included in the first data FDATA is input, as a first count value CNT1. The first-ID processing circuit 530 determines first ID DID1 of the first dimming control device S1 using the first count value CNT1 or the first count value CNT1 and an initial count value, and stores the first ID DID1.

To this end, as shown in FIG. 6, the first-ID processing circuit 530 may include a first counter 531, an ID determination circuit 533, and a first register 535.

The first counter 531 is reset in response to a transition of the chip selection signal CSn from a high level to a low level, and performs the first count operation in response to the first edge of the serial clock signal SCK. The first counter 531 outputs the count value at the time at which the bit firstly having a value of “1” among the bits included in the first data FDATA is input, as the first count value CNT1.

The ID determination circuit 533 uses the first count value CNT1 or the first count value CNT1 and the initial count value to determine the first ID DID1.

The first count value CNT1 shown in FIG. 7 illustrates output values of the first counter included in each of the N dimming control devices S1 to SN represented in time series. In FIG. 7, for convenience of description, a case in which the dimming control devices S1 to SN are implemented as 40 dimming control devices and the dimming data DATA includes six pieces of dimming data DATA1 to DATA6 is illustrated as an example. In FIG. 7, bDATA1 to bDATA6 refer to pieces of delayed data.

When the first data FDATA is 10000000 (bin) or 80 (hex), and the second ID included in the second data IDATA is 00000001 (bin) or 01 (hex), the first count value CNT1 of the first counter included in an i-th dimming control device Si among 40 dimming control devices S1 to S40 is “i−1.”

For example, the first count value CNT1 of the first counter included in the first dimming control device S1 is 0 (dec), the first count value CNT1 of the first counter included in the second dimming control device S2 is 1 (dec), the first count value CNT1 of the first counter included in the third dimming control device S3 is 2 (dec), the first count value CNT1 of the first counter included in a 39-th dimming control device S39 is 38 (dec), and the first count value CNT1 of the first counter included in a 40-th dimming control device S40 is 39 (dec).

When the initial count value of the first counter included in each of the dimming control devices S1 to S40 is 0 (dec), since the ID determination circuit included in each of the dimming control devices S1 to S40 identifies the initial count value of the first counter, the ID determination circuit may determine the first ID of each of the dimming control devices S1 to S40 by adding 1 (dec) to the corresponding first count value CNT1.

Thus, the first ID of the first dimming control device S1 is 1 (dec) when the first count value CNT1 of the first counter included in the first dimming control device S1 is 0 (dec), the first ID of the second dimming control device S2 is 2 (dec) when the first count value CNT1 of the first counter included in the second dimming control device S2 is 1 (dec), the first ID of the 39-th dimming control device S39 is 39 (dec) when the first count value CNT1 of the first counter included in the 39-th dimming control device S39 is 38 (dec), and the first ID of the 40-th dimming control device S40 is 40 (dec) when the first count value CNT1 of the first counter included in the 40-th dimming control device S40 is 39 (dec).

Figure 8:
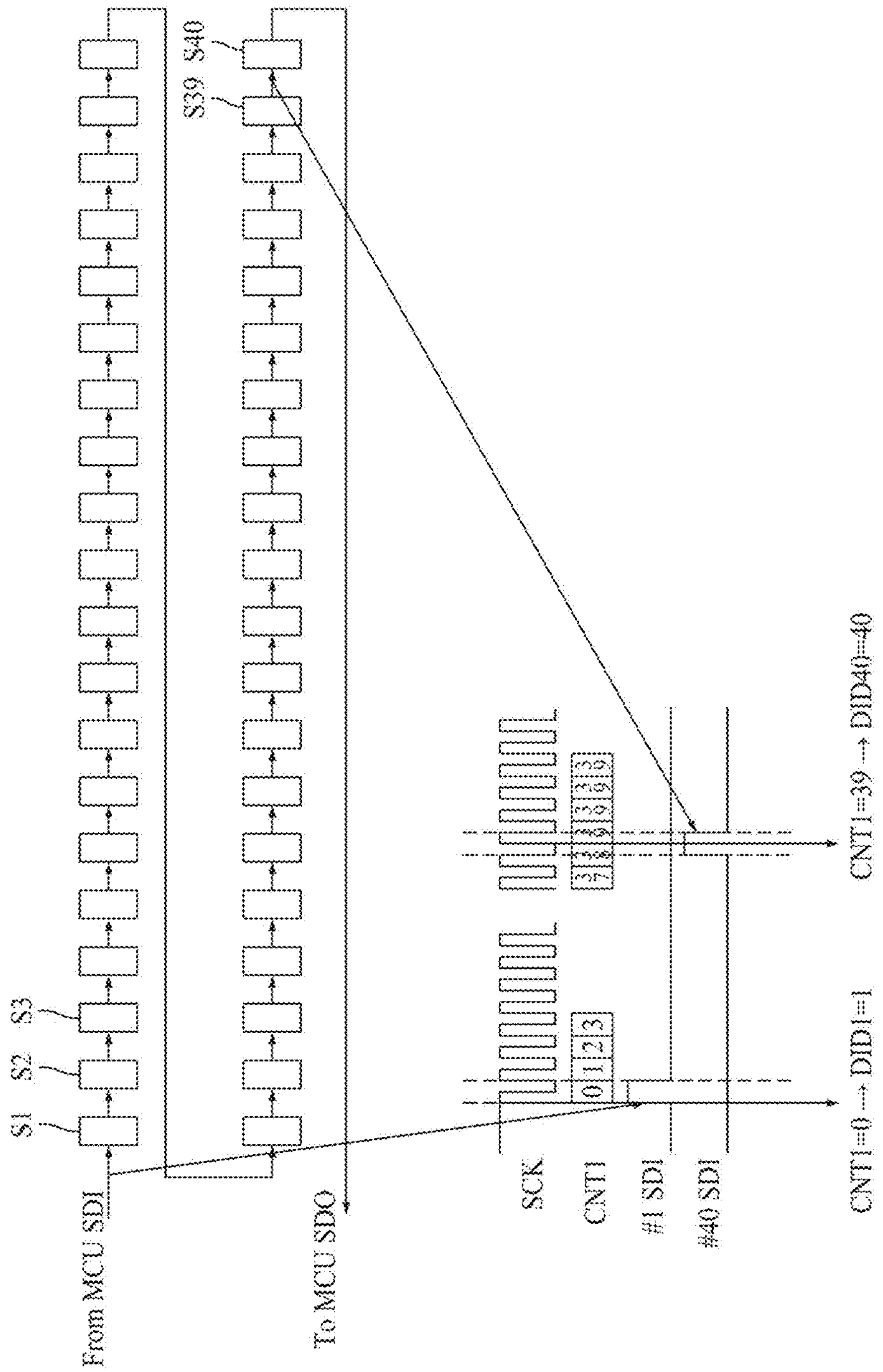
FIG. 8 is a diagram illustrating a method for each of the hybrid dimming control devices shown in FIG. 1 to calculate identification information (ID) thereof.

Specifically, referring to FIGS. 1 and 8, when the micro controller unit 102 and the plurality of dimming control devices S1 to S40 are connected in a daisy-chain manner and the first data of the input data packet SDI input to the first dimming control device S1 is 80 (hex), the first ID DID1 of the first dimming control device S1 is determined to be 1 (dec) since the first count value CNT1 of the first counter 531 of the first dimming control device S1 is 0 (dec), and first ID DID40 of the 40-th dimming control device S40 is determined to be 40 (dec) since the first count value CNT1 of the first counter of the 40-th dimming control device S40 is 39 (dec). At this time, as shown in FIGS. 7 and 8, the first count value CNT1 of the first counter of the 40-th dimming control device S40 is maintained as 39 (dec).

In another embodiment, when the initial count value of the first counter included in each of the dimming control devices S1 to S40 is 1 (dec), since the ID determination circuit included in each of the dimming control devices S1 to S40 identifies the initial count value of the first counter, the corresponding first count value CNT1 may be determined as the first ID of each of the dimming control devices S1 to S40 as it is.

For example, the first ID of the first dimming control device S1 is 1 (dec) when the first count value CNT1 of the first counter included in the first dimming control device S1 is 1 (dec), the first ID of the second dimming control device S2 is 2 (dec) when the first count value CNT1 of the first counter included in the second dimming control device S2 is 2 (dec), the first ID of the 39-th dimming control device S39 is 39 (dec) when the first count value CNT1 of the first counter included in the 39-th dimming control device S39 is 39 (dec), and the first ID of the 40-th dimming control device S40 is 40 (dec) when the first count value CNT1 of the first counter included in the 40-th dimming control device S40 is 40 (dec).

The first register 535 receives and stores the first ID DID1 determined by the ID determination circuit 533.

Referring to FIG. 5 again, the second-ID processing circuit 540 extracts second ID DIF1 from the second data IDATA, and stores the second ID DIF1.

Referring to FIG. 7, when the second ID included in the second data IDATA of the input data packet SDI is 00000001 (bin) or 01 (hex), the second-ID processing circuit included in each of the dimming control devices S1 to S40 extracts 00000001 (bin) or 01 (hex) included in the second data IDATA of the input data packet SDI, which is input to the respective dimming control devices S1 to S40, as the second ID DIF1.

To this end, as shown in FIG. 6, the second-ID processing circuit 540 may include a second counter 541, an ID detection circuit 543, and a second register 545.

The second counter 541 performs a second count operation using the first edge of the serial clock signal SCK to output a second count value CNT2.

The second counter 541 may be reset in response to an output signal of the ID determination circuit 533, and may perform the second count operation using the first edge of the serial clock signal SCK, which is input after the reset, to output the second count value CNT2.

The ID detection circuit 543 receives the input data packet SDI and the second count value CNT2, detects a start position of the second data IDATA using the second count value CNT2 and first information, and extracts the second ID DIF1 from the second data IDATA using the detection result.

The first information may include timing information about a time elapsed from when the bit firstly having a value of “1” among the bits included in the first data FDATA is detected until the second data IDATA is input.

For example, when it is assumed that the second data IDATA starts after seven cycles of the serial clock signal SCK after the bit firstly having a value of “1” among the bits included in the first data FDATA is detected, the ID detection circuit 543 may detect the start position of the second data IDATA using the second count value CNT2 and extract the second ID DIF1 from the second data IDATA using the detection result.

The second register 545 receives and stores the second ID DIF1 output from the ID detection circuit 543.

Referring to FIG. 5 again, the comparison circuit 550 compares the first ID DID1 and the second ID DIF1. In one embodiment, when each of the first ID DID1 and the second ID DIF1 is K-bits data, the comparison circuit 550 may compare the first ID DID1 and the second ID DIF1 in units of bits to generate a comparison signal COMP. Here, K is a natural number greater than or equal to two.

Since the first ID DID1 stored in the first register 535 of the first dimming control device S1 among the dimming control devices S1 to SN is 00000001 (bin), and the second ID DIF1 stored in the second register 545 of the first dimming control device S1 is 00000001 (bin), the comparison circuit 550 outputs the comparison signal COMP having a high level.

However, since the first ID stored in the first register of the i-th dimming control device Si (where $2 \le i \le N$) except for the first dimming control device S1 among the dimming control devices S1 to SN and the second ID (=00000001 (bin)) stored in the second register of the i-th dimming control device do not match, the comparison circuit 550 of the i-th dimming control device Si outputs the comparison signal having a low level.

For example, the first ID (=00000010 (bin) or 00000011 (bin)) stored in the first register of the second dimming control device S2 or the third dimming control device S3 and the second ID (=00000001 (bin)) stored in the second register of the second dimming control device S2 or the third dimming control device S3 do not match, the comparison circuit of the second dimming control device S2 or the third dimming control device S3 outputs the comparison signal having a low level.

The dimming-data processing circuit 560 extracts the dimming data DATA from the input data packet SDI and stores the dimming data DATA. To this end, as shown in FIG. 6, the dimming-data processing circuit 560 may include a dimming-data extraction circuit 561 and a third register 563.

The dimming-data extraction circuit 561 receives the input data packet SDI and the second count value CNT2, detects a start position of the dimming data DATA using the second count value CNT2 and second information, and extracts the dimming data DATA using the detection result.

The second information may include timing information about a time elapsed from when the bit firstly having a value of "1" among the bits included in the first data FDATA is detected until the dimming data DATA is input.

For example, when it is assumed that the dimming data DATA starts after 15 cycles of the serial clock signal SCK after the bit firstly having a value of "1" among the bits included in the first data FDATA is detected, the dimming-data extraction circuit 561 may detect the start position of the dimming data DATA using the second count value CNT2 and extract the dimming data DATA using the detection result.

The third register 563 receives and stores the dimming data DATA output from the dimming-data extraction circuit 561. Each of the first to third registers 535, 545, and 563 is an example of a data storage device.

Referring to FIG. 5 again, in response to the comparison signal COMP output from the comparison circuit 550, the selection circuit 570 outputs one of dummy data corresponding to a first voltage (e.g., the ground voltage) input through a first input terminal thereof and the dimming data DATA input through a second input terminal thereof to the dimming control circuit 580.

Depending on the embodiment, the selection circuit 570 may be replaced with a switch that outputs the dimming data DATA output from the third register 563 to the dimming control circuit 580 in response to the comparison signal COMP having a high level output from the comparison circuit 550.

The dimming control circuit 580 controls dimming of a light source 590 based on the dimming data DATA output from the selection circuit 570. In one embodiment, the dimming control circuit 580 may analyze a grayscale value of the dimming data DATA and perform a hybrid dimming control for controlling the dimming of the light source 590 by selecting one of a PWM driving method or a linear driving method according to the grayscale value. In this case, the linear driving method is a method of controlling the dimming of the light source 590 using an analog signal generated based on the dimming data DATA.

Specifically, the dimming control circuit 580 may control the dimming of the light source 590 by the PWM driving method when the dimming data DATA is low-grayscale data, and control the dimming of the light source 590 by the linear driving method when the dimming data DATA is high-grayscale data.

Figure 9:
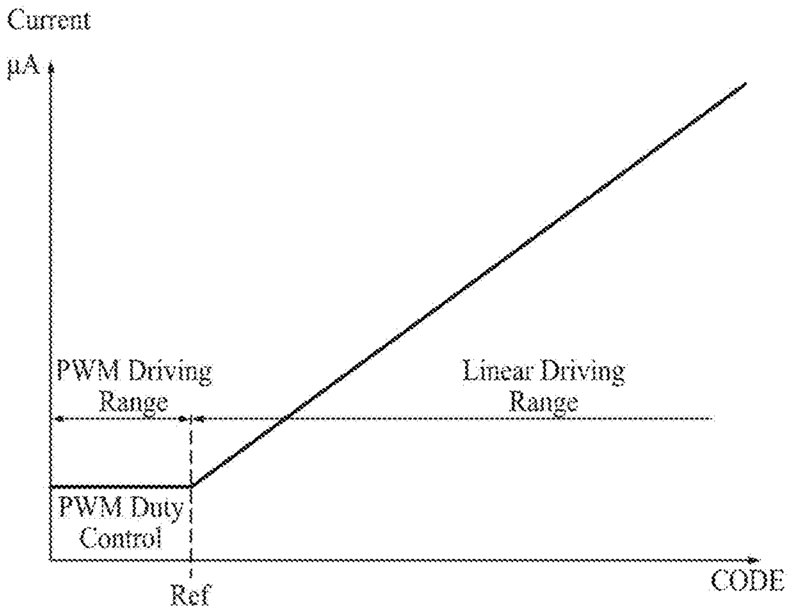
FIG. 9 is a schematic diagram for describing a hybrid dimming control according to one embodiment of the present disclosure.

FIG. 9 conceptually illustrates a method in which the dimming control circuit 580 according to the present disclosure controls the dimming of the light source 590 by a hybrid dimming control method. Referring to FIG. 9, when a first value corresponding to bits CODE included in the dimming data DATA is less than or equal to a second value corresponding to reference bits Ref, the dimming control circuit 580 determines that the dimming data DATA is the low-grayscale data and adjusts the dimming (or brightness) of the light source 590 by the PWM driving method. In addition, when the first value is greater than the second value, the dimming control circuit 580 determines that the dimming data DATA is the high-grayscale data, and adjusts the dimming (or brightness) of the light source 590 by the linear driving method.

In one embodiment, when the dimming data is composed of a first bit group UBIT composed of bits including a high-order bit, a second bit group LBIT composed of bits including a low-order bit, and a third bit group MBIT composed of bits excluding the first bit group UBIT and the second bit group LBIT, the dimming control circuit 580 may determine whether the dimming data DATA is the low-grayscale data or high-grayscale data by determining whether at least one bit having a value of "1" is present in the third bit group MBIT of the dimming data DATA.

For example, when the dimming data DATA is 0001000000100000 (bin) and the third bit group MBIT is 000000 (bin), the dimming control circuit 580 may determine that the dimming data DATA is the low-grayscale data because none of the bits having a value of "1" are included in the third bit group MBIT (=000000). When the dimming control circuit 580 determines that the dimming data DATA is the low-grayscale data, the dimming control circuit 580 controls the dimming of the light source 590 by the PWM driving method using the first bit group UBIT among the dimming data DATA.

As another example, when the dimming data DATA is 0000000001000001 (bin) or 65 (dec) and the third bit group MBIT is 000001 (bin), the dimming control circuit 580 may determine that the dimming data DATA is the high-grayscale data because one bit having a value of "1" is included in the third bit group MBIT (=000001). When the dimming control circuit 580 determines that the dimming data DATA is the high-grayscale data, the dimming control circuit 580 controls the dimming of the light source 590 using an analog signal generated using both the third bit group MBIT and the second bit group LBIT among the dimming data DATA.

Hereinafter, the dimming control circuit according to the present disclosure will be described in more detail with further reference to FIG. 10 in which an operation timing of the dimming control circuit according to the present disclosure is illustrated.

As shown in FIG. 6, the dimming control circuit 580 according to the present disclosure may include an analysis circuit 581, a PWM dimming control circuit 583, and a linear dimming control circuit 589 (or an active dimming control circuit).

The analysis circuit 581 analyzes the dimming data DATA to determine whether the dimming data DATA is the low-grayscale data or high-grayscale data. Specifically, the analysis circuit 581 may determine whether the dimming data DATA is the low-grayscale data or high-grayscale data by determining whether at least one bit having a value of "1" is present in the third bit group MBIT of the dimming data.

1. When Dimming Data DATA is Low-Grayscale Data

For example, when the dimming data DATA is 0001000000100000 (bin) and the third bit group MBIT is 000000 (bin), the analysis circuit 581 determines that the dimming data DATA is the low-grayscale data because none of the bits having a value of "1" are included in the third bit group MBIT (=000000).

An operation of the dimming control circuit 580 will be described with reference to FIGS. 6 and 10 when the dimming data DATA is the low-grayscale data.

When the dimming data DATA is the low-grayscale data, the analysis circuit 581 outputs the first bit group UBIT (=M[3:0]=1) of the dimming data DATA to the PWM dimming control circuit 583, and outputs reference data of 000000111111 (bin) to the linear dimming control circuit 589.

Figure 10:
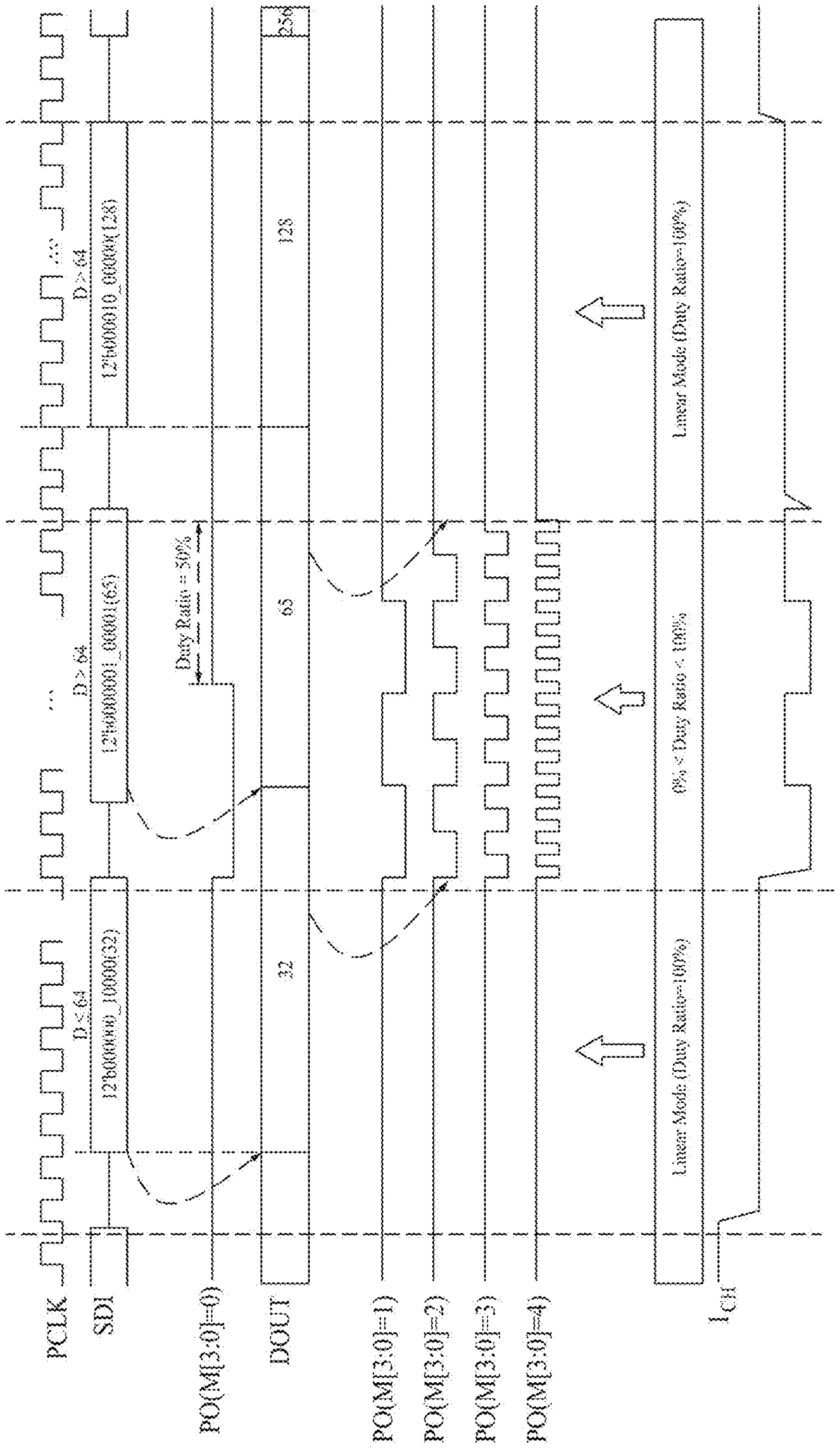
FIG. 10 a diagram illustrating an operation timing of a dimming control circuit according to one embodiment of the present disclosure.

The PWM dimming control circuit 583 generates a PWM signal PO(M[3:0]=1) as shown in FIG. 10 using the PWM clock signal PCLK, which is output from the micro controller unit 102, and the first bit group UBIT (=M[3:0]=0001) of the dimming data DATA (=0001000000100000 (bin)), and controls the dimming of the light source 590 in response to the PWM signal PO(M[3:0]=1).

The light source 590 may include an LED connected between a power line, through which an operating voltage VDD is supplied, and a first connection terminal CP1 and a resistor ER connected between a second connection terminal CP2 and the ground GND. The resistor ER serves to adjust a current $I_{CH}$ flowing through a current path formed by the operating voltage VDD, transistors 587 and 593, and the resistor ER.

The PWM dimming control circuit 583 includes a PWM signal generator 585 and a first transistor 587.

The PWM signal generator 585 may generate the PWM signal PO([3:0]=0), PO([3:0]=1), PO([3:0]=2), PO([3:0]=3), or PO([3:0]=4) whose waveform and duty ratio are determined according to the first bit group UBIT (=M[3:0]) of the dimming data DATA.

The duty ratio of the PWM signal PO([3:0]=0), PO([3:0]=1), PO([3:0]=2), PO([3:0]=3), or PO([3:0]=4) may be greater than 0% and less than 100%.

The PWM signal generator 585 generates the PWM signal PO(M[3:0]=1) as shown in FIG. 10 using the PWM clock signal PCLK and the first bit group UBIT (=M[3:0]=1) of the dimming data DATA, and outputs the PWM signal PO(M[3:0]=1) to a control terminal (e.g., a gate) of the first transistor 587. At this time, as shown in FIG. 6, the PWM signal generator 585 may additionally use a first gate control signal G[1] to generate the PWM signal. The first gate control signal G[1] will be described below.

For example, the PWM signal generator 585 generates the PWM signal PO(M[3:0]=0) as shown in FIG. 10 when the first bit group UBIT (=M[3:0]=0) is 0000 (bin), generates the PWM signal PO(M[3:0]=2) as shown in FIG. 10 when the first bit group UBIT (=M[3:0]=2) is 0010 (bin), generates the PWM signal PO(M[3:0]=3) as shown in FIG. 10 when the first bit group UBIT (=M[3:0]=3) is 0011 (bin), and generates the PWM signal PO(M[3:0]=4) as shown in FIG. 10 when the first bit group UBIT (=M[3:0]=4) is 0100 (bin).

The first transistor 587 controls a connection between the first connection terminal CP1 and an intermediate node ND in response to the output signal PO(M[3:0]=1) of the PWM signal generator 585.

The linear dimming control circuit 589 controls the dimming of the light source 590 using an analog signal DOUT generated using the reference data of 000000111111 (bin).

The linear dimming control circuit 589 includes a digital-to-analog converter DAC, a switch SW, a capacitor CS, an amplifier circuit 591, and a second transistor 593. Each of the transistors 587 and 593 may be a power field-effect transistor (FET) and may be an n-type metal oxide semiconductor FET (nMOSFET).

The digital-to-analog converter DAC converts the reference data of 000000111111 (bin) output from the analysis circuit 581 into an analog signal.

The switch SW controls a connection between an output terminal of the digital-to-analog converter DAC and a first input terminal (e.g., a (+) input terminal) of the amplifier circuit 591 in response to the first gate control signal G[1].

The capacitor CS is connected between the first input terminal of the amplifier circuit 591 and the ground and charges electric charges corresponding to the analog signal corresponding to the reference data of 000000111111 (bin).

A second input terminal (e.g., (−) input terminal) of the amplifier circuit 591 is connected to an output terminal of the amplifier circuit 591, amplifies a difference between a voltage charged in the capacitor CS and an output voltage of the amplifier circuit 591, and outputs the amplified result to a control terminal (e.g., a gate) of the second transistor 593.

The second transistor 593 controls a connection between the intermediate node ND and the second connection terminal CP2 in response to the output signal of the amplifier circuit 591.

Accordingly, since the first transistor 587 adjusts the amount of the current $I_{CH}$ flowing through the first transistor 587 in response to a signal corresponding to the first bit group UBIT (=M[3:0]) of the dimming data DATA, the dimming of the LED included in the light source 590 is adjusted.

2. When Dimming Data DATA is High-Grayscale Data

For example, when the dimming data DATA is 0000000001000001 (bin) or 65 (dec), and the third bit group MBIT is 000001 (bin), the analysis circuit 581 may determine that the dimming data DATA is the high-grayscale data because one bit having a value of "1" is included in the third bit group MBIT (=000001).

An operation of the dimming control circuit 580 when the dimming data DATA is the high-grayscale data will be described with reference to FIGS. 6 and 10.

When the dimming data DATA is the high-grayscale data, the analysis circuit 581 outputs the first bit group UBIT (=M[3:0]=0) of the dimming data DATA to the PWM dimming control circuit 583, and outputs data of 00001000001 (bin) including the third bit group MBIT and the second bit group LBIT among the dimming data DATA to the linear dimming control circuit 589.

The PWM signal generator 585 generates the PWM signal PO(M[3:0]=0) as shown in FIG. 10 using the PWM clock signal PCLK output from the micro controller unit 102, the first gate control signal G[1], and the first bit group UBIT (=M[3:0]=0000) of the dimming data DATA and outputs the PWM signal PO(M[3:0]=0) to the control terminal of the first transistor 587. At this time, the PWM signal PO(M[3:0]=0) has a duty ratio of 100%.

The linear dimming control circuit 589 controls the dimming of the light source 590 using an analog signal corresponding to the data of 00001000001 (bin) including the third bit group MBIT and the second bit group LBIT among the dimming data DATA.

The digital-to-analog converter DAC converts the data of 00001000001 (bin) including the third bit group MBIT and the second bit group LBIT into an analog signal.

The switch SW, which is turned on in response to the first gate control signal G[1], outputs the analog signal DOUT of the digital-to-analog converter DAC to the first input terminal of the amplifier circuit 591, so that the capacitor CS charges electric charges corresponding to the analog signal DOUT.

The amplifier circuit 591 amplifies the difference between the voltage charged in the capacitor CS and the output voltage of the amplifier circuit 591 and outputs the amplified result to the control terminal of the second transistor 593.

Accordingly, the second transistor 593 adjusts the amount of the current $I_{CH}$ flowing through the second transistor 593 in response to the signal corresponding to the data of 00001000001 (bin), so that the dimming of the LED included in the light source 590 is adjusted.

When the dimming data DATA is 0000000010000000 (bin) or 128 (dec), and the third bit group MBIT is 000010 (bin), the analysis circuit 581 may determine that the dimming data DATA is the high-grayscale data because one bit having a value of "1" is included in the third bit group MBIT (=000010). Since a process of processing the dimming data DATA determined to be the high grayscale data by the dimming control circuit 580 is similar to that described above, a detailed description thereof will be omitted.

Figure 11:
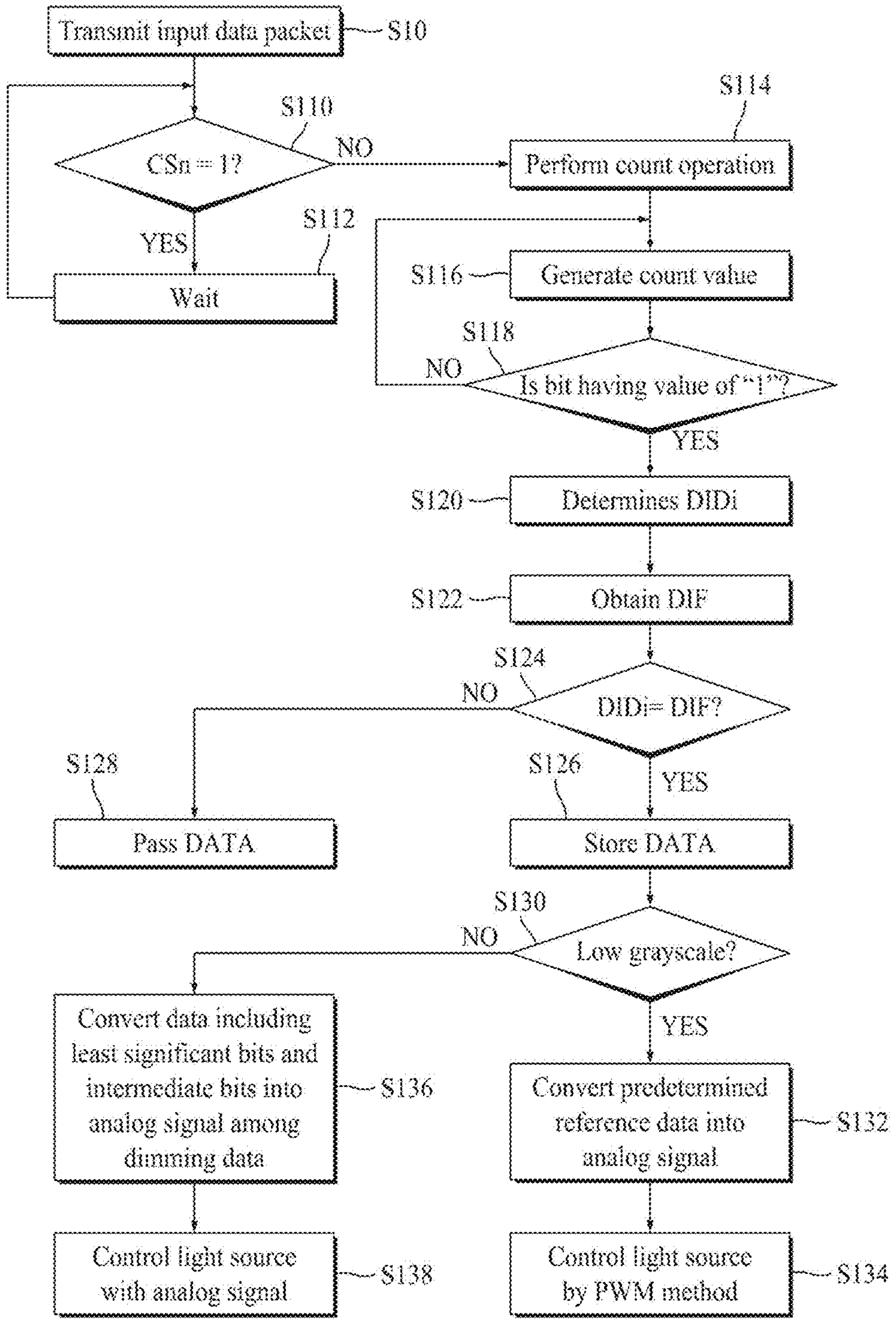
FIG. 11 is a flowchart illustrating a dimming control method according to one embodiment of the present disclosure.

Hereinafter, a dimming control method according to the present disclosure will be described with reference to FIG. 11. FIG. 11 is a flowchart illustrating a dimming control method according to one embodiment of the present disclosure.

The micro controller unit 102 transmits an input data packet SDI including first data FDATA, second data IDATA, and dimming data DATA to the first dimming control device S1 (S10). It is assumed that the first data FDATA includes 1000000 (bin), and second ID included in the second data IDATA is 00000011 (bin).

Meanwhile, the micro controller unit 102 transmits the chip selection signal CSn to each of the dimming control devices S1 to SN through the packet generator 230.

When a level of the chip selection signal CSn supplied to each of the dimming control devices S1 to SN is a high level (YES in S110), each of the dimming control devices S1 to SN waits until the level of the chip selection signal CSn transitions from the high level to a low level (S112).

When the level of the chip selection signal CSn transitions from the high level to the low level (NO in S110), each of the dimming control devices S1 to SN performs a count operation of increasing a count value every rising edge of the serial clock signal SCK (S114), and generates a count value according to the count operation (S116).

Each of the dimming control devices S1 to SN determines a count value at the time at which a bit firstly having a value of "1" among bits of 1000000 (bin) included in the first data FDATA is input, as a first count value CNT1 (S118).

Since the i-th dimming control device Si detects "1" at an i-th rising edge of the serial clock signal SCK, it is assumed that the first count value CNT1 of the i-th dimming control device Si is "i−1" and the first count value CNT1 is maintained as "i−1" as it is until the first count value CNT1 is reset.

For example, it is assumed that the first count value CNT1 of the first dimming control device S1 is 0 (dec) since the first dimming control device S1 detects "1" at a first rising edge of the serial clock signal SCK, it is assumed that the first count value CNT1 of the second dimming control device S2 is 1 (dec) since the second dimming control device S2 detects "1" at a second rising edge of the serial clock signal SCK, and it is assumed that the first count value CNT1 of the third dimming control device S3 is 2 (dec) since the third dimming control device S3 detects "1" at a third rising edge of the serial clock signal SCK.

Each of the dimming control devices S1 to SN determines first ID DIDi thereof using the first count value CNT1 and an initial count value of each of the dimming control devices S1 to SN (S120).

As described above, the first dimming control device S1 determines the first ID DIDi (where i=1) thereof as 00000001 (bin), the second dimming control device S2 determines the first ID DIDi (where i=2) thereof as 00000010 (bin), the third dimming control device S3 determines the first ID DIDi (where i=3) thereof as 00000011 (bin), and the 40-th dimming control device S40 determines the first ID DIDi (where i=40) thereof as 00101000 (bin).

Each of the dimming control devices S1 to SN obtains second ID DIF (=00000011 (bin)) included in the second data IDATA of the input data packet SDI (S122), and compares the first ID DIDi thereof with the second ID of 00000011 (bin) (S124).

As an example, the third dimming control device S3 compares the first ID DID3 (=00000011 (bin)) of the third dimming control device S3 and the second ID DIF (=00000011 (bin)) included in the second data IDATA of the input data packet SDI in units of bits. Since the first ID DID3 (=00000011 (bin)) and the second ID DIF (=00000011 (bin)) match each other, the third dimming control device S3 stores the dimming data DATA input to the third dimming control device S3 (S126).

However, the remaining dimming control devices S1, S2, S4, . . . , and SN except for the third dimming control device S3 pass the dimming data DATA included in the input data packet SDI input to each of the remaining dimming control devices S1, S2, S4, . . . , and SN (S128).

Thereafter, the third dimming control device S3 determines whether the dimming data DATA stored in S126 is low-grayscale data or high-scale data (S130). In one embodiment, the third dimming control device S3 extracts (or separates) a first bit group UBIT, a second bit group LBIT, and a third bit group MBIT from the dimming data DATA, and determines whether the dimming data DATA is the low-grayscale data or the high-grayscale data by determining whether at least one bit having a value of "1" is present in the third bit group MBIT When none of the bits having a value of "1" are included in the third bit group MBIT, the third dimming control device S3 determines the dimming data DATA as low-grayscale data.

When the dimming data DATA is determined as the low-grayscale data (YES in S130), the third dimming control device S3 converts predetermined reference data (e.g., 000000111111 (bin)) into an analog signal (S132), and controls local dimming of the light source 590 by a PWM method using a PWM signal corresponding to the first bit group UBIT and the analog signal that is converted in S132 (S134).

However, when at least one bit having a value of "1" is included in the third bit group MBIT, the third dimming control device S3 determines the dimming data DATA as high-grayscale data.

When the dimming data DATA is determined as the high-grayscale data (NO in S130), the third dimming control device S3 converts data including the third bit group MBIT and the second bit group LBIT into an analog signal (S136).

The third dimming control device S3 sets a duty ratio of the PWM signal to 100% and controls local dimming of the light source 590 by a linear driving method using the analog signal corresponding to the data including the third bit group MBIT and the second bit group LBIT (S138).

As described above, each of the dimming control devices S1 to SN analyzes (or classifies) types of the dimming data DATA by analyzing the dimming data DATA. For example, the dimming control devices S1 to SN analyze (or classify) the types of the dimming data DATA using the third bit group MBIT included in the dimming data DATA.

The dimming control devices S1 to SN control the local dimming of the light source 590 using the first bit group UBIT including a most significant bit (MSB) of the dimming data DATA when the dimming data DATA is the low-grayscale data (e.g., a first type), and control the local dimming of the light source 590 using the second and third bit groups MBIT and LBIT including a least significant bit (LSB) of the dimming data DATA when the dimming data DATA is the high-grayscale data (e.g., a second type).

When the above-described hybrid dimming control method of the present disclosure is used, a response speed of the dimming control increases, and a time difference between a display image and dimming of a backlight unit is less than one frame, so that the display image and the dimming of the backlight unit may match each other.

Figure 12:
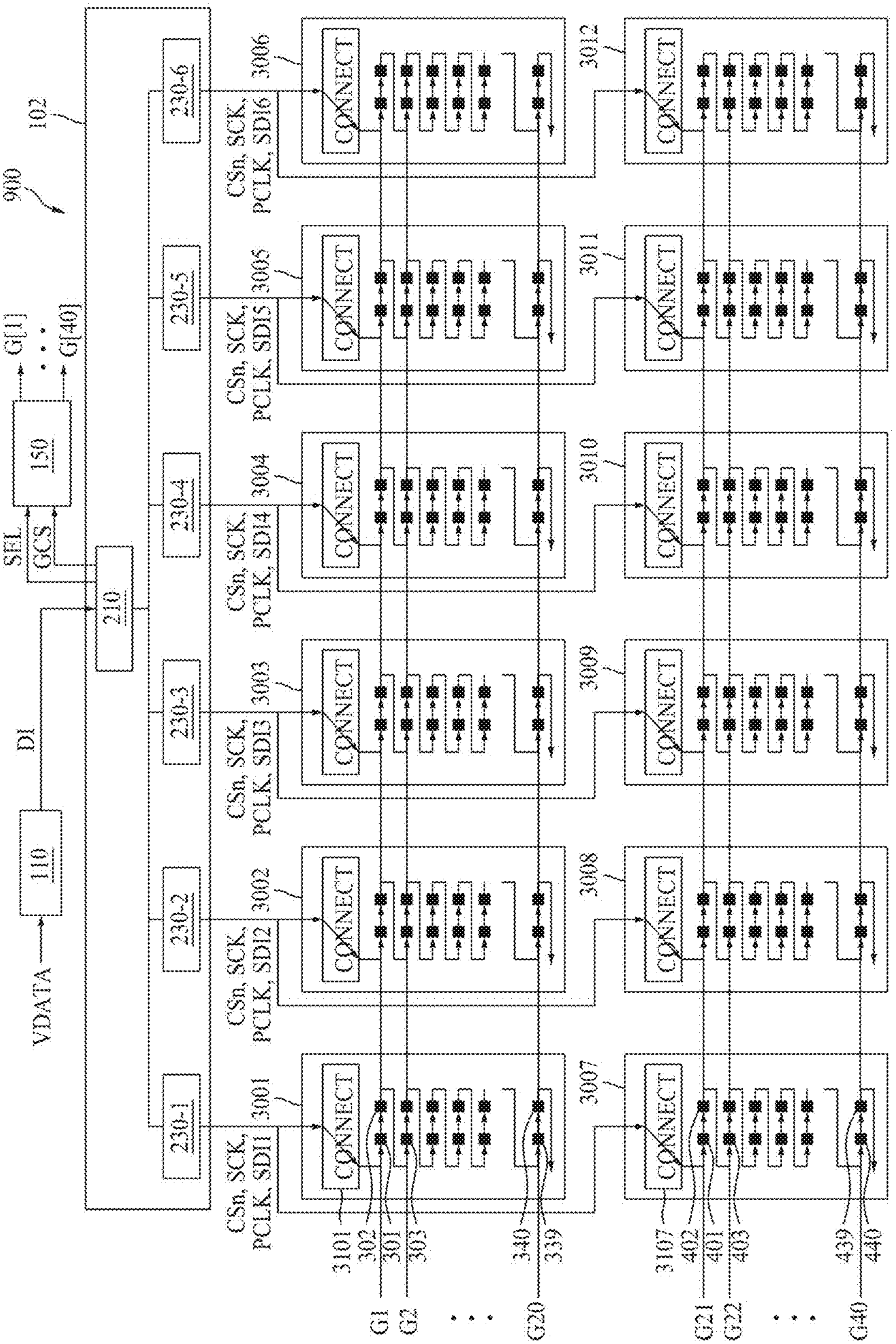
FIG. 12 is a diagram exemplarily illustrating a backlight unit control system including the hybrid dimming control devices according to one embodiment of the present disclosure.

FIG. 12 illustrates an implementation example of the backlight unit control system 100 according to the present disclosure. As shown in FIG. 12, a backlight unit control system 900 includes a dimming data generation circuit 110, a micro controller unit 102, boards 3001 to 3012 on which a plurality of dimming control devices 301 to 340 and 401 to 440 are mounted, and a gate control signal generation circuit 150.

The backlight unit control system 900 shown in FIG. 12 may be used for controlling dimming of a display device or television (TV) that includes a backlight unit (BLU). At this time, the display device may be a thin-film-transistor liquid-crystal display (TFT-LCD) device or an LED display device.

In accordance with the present embodiment, a display panel included in the display device may be divided into a plurality of regions (e.g., 12 regions), and the plurality of boards 3001 to 3012 may be arranged to correspond to the respective regions of the display panel as shown in FIG. 12. Each of the boards 3001 to 3012 may be a printed circuit board (PCB).

The plurality of dimming control devices 301 to 340 are mounted on each of the boards 3001 to 3006, and the plurality of dimming control devices 401 to 440 are mounted on each of the boards 3007 to 3012. The dimming control devices mounted on each of the boards 3001 to 3012 may constitute a dimming control device group. That is, when the backlight unit control system 900 includes K dimming control device groups, the backlight unit control system 900 includes K boards, and one dimming control device group is mounted for each board.

As an example, one dimming control device group mounted on one board may include 40 dimming control devices 301 to 340 or 401 to 440. In accordance with the embodiment, p (e.g., two) dimming control devices may be disposed for each row of each of the boards 3001 to 3012. In addition, the p dimming control devices may be connected to one gate line for each board.

In addition, the dimming control devices 301 to 340 may be disposed in a form of an m*p matrix in each of the boards 3001 to 3006 and the dimming control devices 401 to 440 may be disposed in the form of the m*p matrix in each of the boards 3007 to 3012, wherein m may be 20 and p may be 2.

Meanwhile, a plurality of light sources (not shown) to be controlled may be installed on each of the boards 3001 to 3012 so as to be electrically connected to the dimming control devices 301 to 340 and 401 to 440, respectively. In one embodiment, the light source may include an LED group that includes at least one LED or at least one organic LED (OLED).

Each of the dimming control devices 301 to 340 and 401 to 440 may control dimming of a predetermined number of light sources (e.g., six LEDs).

Hereinafter, for convenience of description, the boards 3001 to 3006 disposed at an upper end region in FIG. 12 will be referred to as a first board group, and the boards 3007 to 3012 disposed at a lower end region will be referred to as a second board group. When the backlight unit control system 900 includes K boards and K dimming control device groups, the first board group and the second board group may each consist of K/2 boards.

Each of the dimming control devices 301 and 302 disposed in a first row of each of the boards 3001 to 3006 of the first board group is commonly connected to a first gate line G1, each of the dimming control devices 303 and 304 disposed in a second row of each of the boards 3001 to 3006 of the first board group is commonly connected to a second gate line G2, and each of the dimming control devices 339 and 340 disposed in a 20-th row of each of the boards 3001 to 3006 of the first board group is commonly connected to a 20-th gate line G20.

Each of the dimming control devices 401 and 402 disposed in a first row of each of the boards 3007 to 3012 of the second board group is commonly connected to a 21-st gate line G21, each of the dimming control devices 403 and 404 disposed in a second row of each of the boards 3007 to 3012 of the second board group is commonly connected to a 22-nd gate line G22, and each of the dimming control devices 439 and 440 disposed in a 20-th row of each of the boards 3007 to 3012 of the second board group is commonly connected to a 40-th gate line G40.

In accordance with the above-described embodiment, when each of the dimming control devices 301 to 340 mounted on each of the boards 3001 to 3006 and the dimming control devices 401 to 440 mounted on each of the boards 3007 to 3012 receives an input data packet including dimming data from the micro controller unit 102, dimming information corresponding to the dimming data is directly displayed through the light sources, which are controlled by the respective dimming control devices 301 to 340 and 401 to 440, by a corresponding gate control signal transmitted through the corresponding gate line. Accordingly, a variation between an image processed by the display device and the dimming information processed by the backlight unit control system 900 is less than one frame.

As each of the dimming control devices 301 to 340 and 401 to 440 connected to the gate lines G1 to G40 operates simultaneously according to the gate control signal transmitted through each of the gate lines G1 to G40, each of the dimming control devices 301 to 340 and 401 to 440 controls local dimming of a region managed by itself. The gate control signals transmitted through the gate lines G1 to G40 are sequentially generated and do not overlap each other.

Since the backlight unit control system 900 performs local dimming for the light sources in units of gate lines, the backlight unit control system 900 according to the present disclosure has an effect of preventing a mismatch between the image and the local dimming as compared to a conventional dimming control technique in which local dimming is performed in units of frames.

The boards 3001 and 3007 disposed in a first column are commonly connected to a first packet generator 230-1 of the micro controller unit 102, and the boards 3002 and 3008 disposed in a second column are commonly connected to a second packet generator 230-2 of the micro controller unit 102, and the boards 3006 and 3012 disposed in a sixth column are commonly connected to a sixth packet generator 230-6 of the micro controller unit 102.

For example, even when the dimming control devices 301 and 401 respectively disposed on the different boards 3001 and 3007 are connected to the first packet generator 230-1 respectively through connectors 3101 and 3107, the micro controller unit 102 may control an operation of the dimming control device 301 using a first gate control signal G[1] transmitted through the first gate line G1 and may control an operation of the dimming control device 401 using a 21-st gate control signal G[21]transmitted through the 21-st gate line G21.

Identification information (which is referred to as "ID") that may uniquely identify an i-th dimming control device disposed on each of the boards 3001 to 3012 is identical to each other. Here, i is a natural number and satisfies 1≤i≤40.

For example, the ID of the dimming control device 301 firstly disposed on each of the boards 3001 to 3006 and the ID of the dimming control device 401 firstly disposed on each of the boards 3007 to 3012 are identical to each other, and the ID of the dimming control device 340 lastly disposed on each of the boards 3001 to 3006 and the ID of the dimming control device 440 lastly disposed on each of the boards 3007 to 3012 are identical to each other.

The dimming data generation circuit 110 receives video data VDATA corresponding to RBG values from the outside, analyzes the video data VDATA, generates dimming data DI according to the analysis result, and outputs the dimming data DI to the controller 210 of the micro controller unit 102.

Figure 13:
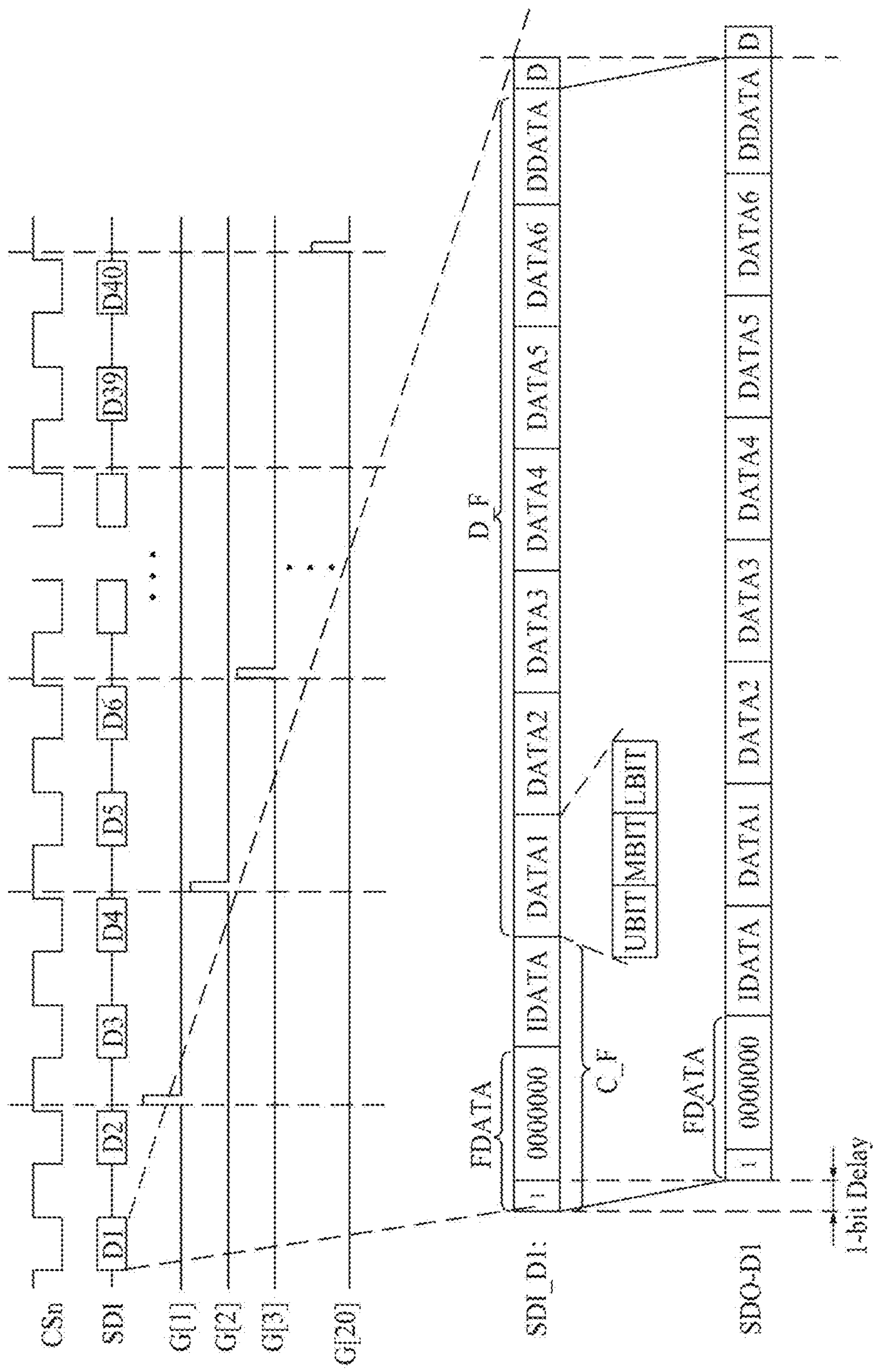
FIG. 13 is a diagram illustrating a timing of each of signals used in the backlight unit control system shown in FIG. 12.

The gate control signal generation circuit 150 may generate gate control signals G[1] to G[20] having timings as shown in FIG. 13 in response to a gate control signal GCS and selection signals SEL, which are output from the controller 210. For convenience of description, only the gate control signals G[1] to G[20] for a first gate line G1 to a 20-th gate line G20 are shown in FIG. 13.

For example, the gate control signal generation circuit 150 may include a demultiplexer. For example, the demultiplexer may generate the gate control signals G[1] to G[20] having the timings shown in FIG. 13 in response to the gate control signal GCS input to an input terminal thereof and the selection signals SEL input to selection terminals. For example, the first gate control signal G[1] is supplied to the first gate line G1, and the 20-th gate control signal G[20] is supplied to the 20-th gate line G20.

The micro controller unit 102 generates an input data packet SDIi based on a serial peripheral interface (SPI) communication protocol based on the dimming data DI. Here, unlike in FIG. 2, the micro controller unit 102 shown in FIG. 12 includes six packet generators 230-1 to 230-6. In FIG. 12, it is illustrated that the micro controller unit 102 includes six packet generators 230-1 to 230-6, but this is merely one example, and the micro controller unit 102 may also include five or less packet generators or seven or more packet generators.

Each of the packet generators 230-1 to 230-6 outputs the input data packets SDI1 to SDI6 to the firstly disposed dimming control device 301 and 401 among the plurality of dimming control devices 301 to 340, which are mounted on each of the boards 3001 to 3006 in a daisy-chain manner, and the plurality of dimming control devices 401 to 440, which are mounted on each of the boards 3007 to 3012 in a daisy-chain manner.

The structure and transmission and reception timings of the input data packet SDIi in a case in which each of the dimming control devices 301 to 340 disposed on each of the boards 3001 to 3006 and the dimming control devices 401 to 440 disposed on each the boards 3007 to 3012 controls local dimming of six LEDs will be described with reference to FIG. 13.

FIG. 13 is a diagram illustrating a timing of each of signals used in the backlight unit control system shown in FIG. 12. As shown in FIG. 13, the input data packet SDI includes a plurality of data packets D1 to D40. In this case, an i-th data packet Di included in the input data packet SDI is a data packet for adjusting brightness of six LEDs connected to the i-th dimming control device.

For example, a first data packet D1 is a data packet for adjusting brightness of the six LEDs connected to a first dimming control device 301, a second data packet D2 is a data packet for adjusting brightness of the six LEDs connected to a second dimming control device 302, and a 40-th data packet D40 is a data packet for adjusting brightness of the six LEDs connected to a 40-th dimming control device 340.

Further, when the six LEDs are connected to one dimming control device, first dimming data DATA1 included in the first data packet D1 is dimming data for adjusting dimming of a first LED among the six LEDs, second dimming data DATA2 is dimming data for adjusting dimming of a second LED among the six LEDs, and sixth dimming data DATA6 is dimming data for adjusting dimming of a sixth LED among the six LEDs.

At this time, the six LEDs may be connected to each dimming control device through connection pins (not shown), and each dimming control device controls each of the six LEDs using the first to sixth data packets D1 to D6 by supplying the corresponding dimming data to the connection pin that is determined in advance according to the order in which the first to sixth dimming data DATA1 to DATA6 included in the first data packet D1 are received.

In FIG. 13, each of the data packets D1 to D40 is illustrated as including six pieces of dimming data DATA1 to DATA6 because it is assumed that each of the dimming control devices 301 to 340 and 401 to 440 controls six LEDs, but when each of the dimming control devices 301 to 340 and 401 to 440 controls T LEDs (where T is a natural number greater than or equal to 2), T pieces of dimming data DATA1 to DATAT are included in each of the data packets D1 to D40.

The gate control signal generation circuit 150 controls an activation timing of each of the gate control signals G[1] to G[40]. For example, as shown in FIG. 13, the gate control signal generation circuit 150 generates the first gate control signal G[1] in the form of a pulse after two data packets D1 and D2 are supplied to two dimming control devices 301 and 302, generates a second gate control signal G[2] in the form of a pulse after two data packets D3 and D4 are supplied to two dimming control devices 303 and 304, and generates a 40-th gate control signal G[40] in the form of a pulse after two data packets D39 and D40 are supplied to two dimming control devices 339 and 340.

A data format of each of the data packets D1 to D40 is the same. For example, each of the data packets D1 to D40 may include first data FDATA, second data IDATA, and six pieces of dimming data DATA1 to DATA6, and may further include first dummy data DDATA depending on the embodiment. In addition, each of the dimming data DATA1 to DATA6 includes a first bit group UBIT, a second bit group LBIT, and a third bit group MBIT.

A data format of each of input data packets SDI2 to SDI6 is the same as a data format of an input data packet SDI1. Accordingly, an operation of each of the dimming control devices, which processes each of the input data packets SDI2 to SDI6 is almost identical to an operation of each of the dimming control devices, which processes the data packet SDI1.

At this time, as shown in FIG. 13, each of the dimming data DATA1 to DATA6 may include the first bit group UBIT, the second bit group LBIT, and the third bit group MBIT, and each of the dimming control devices 301 to 340 and 401 to 440 may determine whether each of the dimming data DATA1 to DATA6 is low-grayscale data or high-grayscale data using the third bit group MBIT. When each of the dimming data DATA1 to DATA6 is the low-grayscale data, each of the dimming control devices 301 to 340 and 401 to 440 may adjust brightness of the corresponding light source by a PWM method (or a PWM signal) using the first bit group UBIT. When each of the dimming data DATA1 to DATA6 is the high-grayscale data, each of the dimming control devices 301 to 340 and 401 to 440 may adjust the brightness of the corresponding light source using both the second bit group LBIT and the third bit group MBIT.

An example of the input data packet SDI generated by the micro controller unit 102 using the dimming data DI is the same as that shown in FIG. 3, and thus a detailed description thereof will be omitted.

Since each of the packet generators 230-1 to 230-6 is commonly connected to one of the boards 3001 to 3006 included in the first board group and one of the boards 3007 to 3012 included in the second board group, each of the packet generators 230-1 to 230-6 outputs the input data packet SDIi generated based on bits determined by the controller 210 to the first dimming control device among the plurality of dimming control devices 301 to 340 and 401 to 440 that are connected in a daisy-chain manner on two board connected thereto. Meanwhile, in addition to the input data packets SDI1 to SDI6, each of the packet generators 230-1 to 230-6 may additionally output a chip selection signal CSn, a serial clock signal SCLK, and a PWM clock signal PCLK for dimming control to the first dimming control device of each of the boards 3001 to 3012 connected thereto.

Meanwhile, unlike the micro controller unit 102 shown in FIG. 2, the micro controller unit 102 shown in FIG. 12 may generate and output the gate control signal GCS and the selection signals SEL for generating the gate control signals G[1] to G[40], and the gate control signal GCS may be divided as many as the number of the gate lines by the gate control signal generation circuit 150 and input to the respective gate lines G1 to G40.

Each of the dimming control devices 301 to 340 and 401 to 440 controls dimming of the plurality of LEDs connected to the corresponding dimming control device using the input data packet received from the micro controller unit 102. The configuration and operation of each of the dimming control devices 301 to 340 and 401 to 440 are the same as those shown in FIGS. 3 to 10, and thus a detailed description thereof will be omitted.

It should be understood by those skilled in the art that the present disclosure can be implemented in other specific forms without changing the technical concept and essential features of the present disclosure.

Further, the methods described herein may be implemented, at least in part, using one or more computer programs or components. The components may be provided as a series of computer instructions on a computer readable medium or machine readable medium, including a volatile or non-volatile memory. The instructions may be provided as software or firmware, and may, in whole or in part, be implemented in a hardware configuration such as application-specific integrated circuits (ASICs), field-programmable gate arrays (FPGAs), digital signal processors (DSPs), or other similar devices. The instructions may be configured to be executed by one or more processors or other hardware configurations, and the processor or other hardware components may perform all or part of the methods and procedures disclosed herein when executing the series of computer instructions.

According to the present disclosure, when dimming data is low-grayscale data, a light source of a backlight unit can be controlled using a PWM signal so that a current flowing through the light source can be more precisely controlled, and when the dimming data is high-grayscale data, the light source of the backlight unit can be controlled using an analog signal so that color reproducibility can be improved, thereby improving image quality displayed through a display panel.

Further, according to the present disclosure, local dimming is performed on a backlight unit in units of gate lines, so that a time difference between an image displayed on a display panel and the local dimming of the backlight unit can be reduced to be less than one frame period, thereby preventing a mismatch between the image and the local dimming.

Further, according to the present disclosure, a micro controller unit and a plurality of dimming control devices are connected in a daisy-chain manner so that the number of channels between the micro controller unit and the plurality of dimming control devices can be reduced, and a time for transmitting an input data packet to the dimming control devices from the micro controller unit decreases so that local dimming for light sources can be quickly performed and response time can improve.

Further, according to the present disclosure, one micro controller unit is connected in a daisy-chain manner to a plurality of dimming control devices, and an output data packet of each of the dimming control devices is delayed by one bit from an input data packet, so that an overall delay time generated by the plurality of dimming control devices can be reduced, and a timing margin can be improved, thereby increasing the number of the dimming control devices connectable to one micro controller unit.

Further, according to the present disclosure, each of dimming control devices can set ID thereof using bits included in first data of an input data packet only by transmitting the input data packet once without transmitting a separate command for setting the ID, so that each of the dimming control devices can determine by itself whether dimming data transmitted from a micro controller unit is dimming data to be processed by itself based on the set ID.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A hybrid dimming control device comprising:

an analysis circuit configured to determine a type of dimming data for controlling local dimming of a light source included in a backlight unit by analyzing the dimming data;

a pulse width modulation (PWM) dimming control circuit configured to control the local dimming of the light source using a first bit group including a most significant bit (MSB) of the dimming data when the type of the dimming data is a first type, wherein the first type is a type in which a grayscale value corresponding to the dimming data is equal to or less than a predetermined reference grayscale value; and an active dimming control circuit configured to control the local dimming of the light source using a second bit group including a least significant bit (LSB) of the dimming data and a third bit group composed of bits excluding the first and second bit groups from the dimming data when the type of the dimming data is a second type, wherein the second type is a type in which the grayscale value corresponding to the dimming data is greater than the predetermined reference grayscale value.

2. The hybrid dimming control device of claim 1, wherein the analysis circuit determines the type of the dimming data as the first type when a bit having a value of "1" is not included in the third bit group, and determines the type of the dimming data as the second type when at least one bit having a value of "1" is included in the third bit group.

3. A hybrid dimming control device comprising:

an analysis circuit configured to determine a type of dimming data for controlling local dimming of a light source included in a backlight unit by analyzing the dimming data;

a pulse width modulation (PWM) dimming control circuit configured to control the local dimming of the light source using a first bit group including a most significant bit (MSB) of the dimming data when the type of the dimming data is a first type; and an active dimming control circuit configured to control the local dimming of the light source using a second bit group including a least significant bit (LSB) of the dimming data and a third bit group composed of bits excluding the first and second bit groups from the dimming data when the type of the dimming data is a second type, wherein the PWM dimming control circuit controls the dimming of the light source using a PWM signal generated using bits included in the first bit group, wherein the active dimming control circuit controls the dimming of the light source using an analog signal generated using bits included in the second and third bit groups, wherein the PWM dimming control circuit includes a first transistor connected to the light source, wherein the active dimming control circuit includes a second transistor connected to the first transistor, and when the type of the dimming data is the first type, the analysis circuit transmits predetermined reference data to the active dimming control circuit, the active dimming control circuit controls the second transistor using an analog signal corresponding to the predetermined reference data, and the PWM dimming control circuit determines a waveform and a duty ratio of the PWM signal for controlling the dimming of the light source using the bits included in the first bit group, and controls the first transistor using the PWM signal generated based on the determined waveform and duty ratio of the PWM signal.

4. The hybrid dimming control device of claim 3, wherein:

the PWM dimming control circuit includes a first transistor connected to the light source, the active dimming control circuit includes a second transistor connected to the first transistor, and when the type of the dimming data is the second type, the PWM dimming control circuit generates the PWM signal having a duty ratio of 100% using the bits included in the first bit group, the first transistor is turned on in response to the PWM signal having the duty ratio of 100%, the active dimming control circuit generates the analog signal for controlling the dimming of the light source using the bits included in the second and third bit groups and controls the second transistor using a signal corresponding to the analog signal.

5. The hybrid dimming control device of claim 3, wherein:

the hybrid dimming control device is any one of a plurality of dimming control devices connected in a daisy-chain manner to a micro controller unit configured to output an input data packet based on a serial peripheral interface (SPI) protocol, the dimming data being included in the input data packet, and each of the dimming control devices controls dimming of a plurality of light sources included in a region assigned for each dimming control device on the backlight unit.

6. The hybrid dimming control device of claim 5, wherein:

when the input data packet further includes first data and second data, the dimming control device determines first identification (ID) information, which is ID thereof, using an MSB having a value set to "1" among bits included in the first data and extracts a second ID, which is ID of the dimming control device configured to process the dimming data among the plurality of dimming control devices, from the second data, and further includes a control circuit configured to output the dimming data to the analysis circuit when the first ID and the second ID match.

7. The hybrid dimming control device of claim 6, wherein the control circuit further includes:

a first-ID processing circuit configured to perform a first count operation in response to a first edge of a serial clock signal, and determine the first ID using a first count value that is a count value when the MSB is input;

a second-ID processing circuit configured to perform a second count operation in response to the first edge of the serial clock signal, and extracts the second ID from the second data using a second count value according to the second count operation;

a comparison circuit configured to compare the first ID and the second ID to generate a comparison signal;

a dimming-data processing circuit configured to extract the dimming data from the input data packet; and a selection circuit configured to output the dimming data to the analysis circuit in response to the comparison signal, which is output from the comparison circuit, when the first ID and the second ID match.

8. The hybrid dimming control device of claim 5, wherein the dimming control device further includes a D-flip-flop circuit configured to capture the input data packet at a second edge of a serial clock signal, and delay and output the input data packet by one bit.

9. The hybrid dimming control device of claim 5, wherein:

the plurality of dimming control devices from K dimming control device groups composed of N dimming control devices, where N is a natural number greater than or equal to two, the backlight unit includes a plurality of gate lines electrically connecting p dimming control devices included in each of the dimming control device groups, where p is a natural number less than N, and a gate control signal is applied to a j-th gate line after p input data packets are input to the p dimming control devices connected to the j-th gate line for each dimming control device group, so that the p dimming control devices connected to the j-th gate line for each dimming control device group control local dimming of the light sources.

10. The hybrid dimming control device of claim 9, wherein among the K dimming control device groups, K/2 dimming control device groups are disposed to correspond to an upper end region of the backlight unit, and remaining K/2 dimming control device groups are disposed to correspond to a lower end region of the backlight unit, and an m-th dimming control device group among the K/2 dimming control device groups disposed in the upper end region and an m-th dimming control device group among the K/2 dimming control device groups disposed in the lower end region are connected to one packet generator in the micro controller unit.

11. A hybrid dimming control method comprising:

determining a type of dimming data by analyzing the dimming data;

controlling local dimming of a light source included in a backlight unit using a pulse width modulation (PWM) signal generated using a first bit group including a most significant bit (MSB) of the dimming data when the type of the dimming data is a first type in which a grayscale value corresponding to the dimming data is equal to or less than a predetermined reference grayscale value; and controlling the local dimming of the light source suing an analog signal generated using a second bit group including a least significant bit (LSB) of the dimming data and a third bit group composed of bits excluding the first and second bit groups from the dimming data when the type of the dimming data is a second type in which the grayscale value corresponding to the dimming data is greater than the predetermined reference grayscale value, wherein:

in the controlling of the local dimming of the light source of the backlight unit using the PWM signal, a waveform and a duty ratio of the PWM signal for controlling the dimming of the light source are determined using bits included in the first bit group, a first transistor connected to the light source is controlled using the PWM signal generated based on the determined waveform and duty ratio of the PWM signal, and a second transistor connected to the first transistor is controlled using an analog signal corresponding to predetermined reference data.

12. The hybrid dimming control method of claim 11, wherein in the determining of the type of the dimming data, the type of the dimming data is determined as the first type when a bit having a value of "1" is not included in the third bit group, and the type of the dimming data is determined as the second type when at least one bit having a value of "1" is included in the third bit group.

13. The hybrid dimming control method of claim 11, wherein in the controlling of the local dimming of the light source using the analog signal, the PWM signal having a duty ratio of 100% is generated using bits included in the first bit group, a first transistor connected to the light source is turned on using the PWM signal having the duty ratio of 100%, and a second transistor connected to the first transistor is controlled using a signal corresponding to the analog signal generated using bits included in the second and third bit groups.

14. The hybrid dimming control method of claim 11, wherein the hybrid dimming control method is performed by any one of a plurality of dimming control devices connected in a daisy-chain manner to a micro controller unit configured to output an input data packet based on a serial peripheral interface (SPI) protocol, the dimming data being included in the input data packet, and each of the dimming control devices controls dimming of a plurality of light sources included in a region assigned for each dimming control device on the backlight unit.

15. The hybrid dimming control method of claim 14, further comprising:

determining a first identification information-(ID), which is ID thereof, using the MSB having a value set to "1" among bits of first data included in the input data packet; and extracting a second ID, which is ID of the dimming control device configured to process the dimming data among the plurality of dimming control devices, from second data included in the input data packet, wherein the determining of the type of the dimming data is performed when the first ID and the second ID match, and the dimming data is passed when the first ID and the second ID do not match.

16. The hybrid dimming control method of claim 14, further comprising capturing the input data packet at a second edge of a serial clock signal, and delaying and outputting the input data packet by one bit.

17. The hybrid dimming control method of claim 14, wherein:

the plurality of dimming control devices from K dimming control device groups composed of N dimming control devices, where N is a natural number greater than or equal to two, the backlight unit includes a plurality of gate lines electrically connecting p dimming control devices included in each of the dimming control device groups, where p is a natural number less than N, and a gate control signal is applied to a j-th gate line after p input data packets are input to the p dimming control devices connected to the j-th gate line for each dimming control device group, so that the p dimming control devices connected to the j-th gate line for each dimming control device group control the local dimming of the light sources.

* * * * *